(12) United States Patent
Endo et al.

(10) Patent No.: US 7,469,066 B2
(45) Date of Patent: Dec. 23, 2008

(54) INFORMATION CODING APPARATUS, INFORMATION DECODING APPARATUS, AND METHOD AND PROGRAM FOR THE SAME

(75) Inventors: Masahiro Endo, Tokyo (JP); Yoshiaki Kurokawa, Chiba (JP); Shogo Yagi, Naka-gun (JP); Takaya Tanabe, Tokorozawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 810 days.

(21) Appl. No.: 10/517,625

(22) PCT Filed: Apr. 8, 2004

(86) PCT No.: PCT/JP2004/005090

§ 371 (c)(1),
(2), (4) Date: Dec. 10, 2004

(87) PCT Pub. No.: WO2004/090801

PCT Pub. Date: Oct. 21, 2004

(65) Prior Publication Data

US 2005/0226515 A1    Oct. 13, 2005

(30) Foreign Application Priority Data

Apr. 8, 2003    (JP) .............................. 2003-104048

(51) Int. Cl.
   *G06K 9/36*    (2006.01)
(52) U.S. Cl. .................. 382/232; 382/233; 382/240

(58) Field of Classification Search ................. 382/232, 382/233, 240, 243, 291; 375/259; 235/462.09, 235/462.1; 345/603, 530, 555
See application file for complete search history.

(56) References Cited

U.S. PATENT DOCUMENTS 4,539,691 A * 9/1985 Ogawa et al. ............... 375/259

(Continued)

FOREIGN PATENT DOCUMENTS

EP    0 984 385 A2    3/2000

(Continued)

OTHER PUBLICATIONS

International Search Report for PCT/JP2004/005090, dated Jun. 22, 2004; ISA/JPO.

(Continued)

*Primary Examiner*—Anh Hong Do
(74) *Attorney, Agent, or Firm*—Harness, Dickey & Pierce, P.L.C.

(57) ABSTRACT

An information coding apparatus, an information decoding apparatus, and a method and a program therefor are provided, which can represent a large amount of information with a small number of pixels. Information bits which are inputted are coded as a block of a two-dimensional image made up from m (where m is a natural number)×n (where n is a natural number) pixels. Specifically, pixels which represent the information bits are arranged in a code area, which is an area of (m−o)×(n−p) pixels within a code block of m×n pixels (where o and p are natural numbers which satisfy 0<o<m and 0<p<n); and, no pixels which represent the information bits are arranged in a guide area, which is an area of the other pixels within the code block of m×n pixels.

18 Claims, 12 Drawing Sheets

U.S. PATENT DOCUMENTS

| | | | |
|---|---|---|---|
| 5,511,058 A | 4/1996 | Visel | |
| 6,064,586 A | 5/2000 | Snyder | |
| 6,233,083 B1 | 5/2001 | Minagawa | |
| 7,333,663 B1 * | 2/2008 | Schumacher | 382/240 |
| 7,350,710 B2 * | 4/2008 | Sakai et al. | 235/462.09 |
| 2003/0044084 A1 | 3/2003 | Endo et al. | 382/291 |

FOREIGN PATENT DOCUMENTS

| | | |
|---|---|---|
| JP | 10-049610 | 2/1998 |
| JP | 10-190473 | 7/1998 |
| JP | 10-302406 | 11/1998 |
| JP | 2000-148904 | 5/2000 |
| JP | 2001-075463 | 3/2001 |
| JP | 2002-343028 | 11/2002 |
| JP | 2002-366014 | 12/2002 |
| JP | 2002-366014 A | 12/2002 |
| JP | 2003-078746 | 3/2003 |
| JP | 2003-150898 | 5/2003 |
| WO | 97/43669 | 11/1997 |

OTHER PUBLICATIONS

"Two-Dimensional Modulation Code for Multilayered Waveguide Holographic Memory", M. Endo, et al., Jpn.J.Appl.Phys.vol. 41 (2002, pp. 1846-1850, Mar. 2002.

* cited by examiner

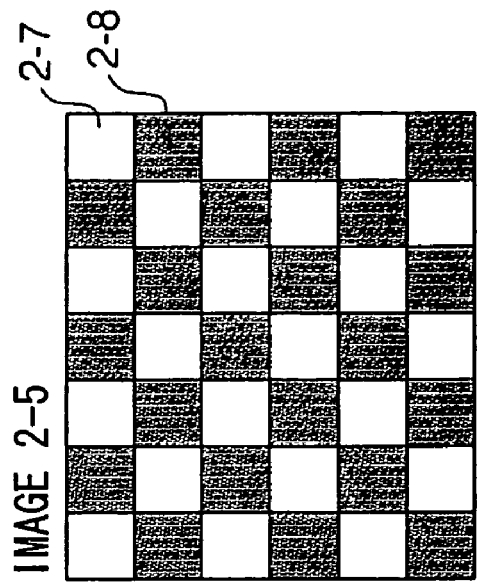
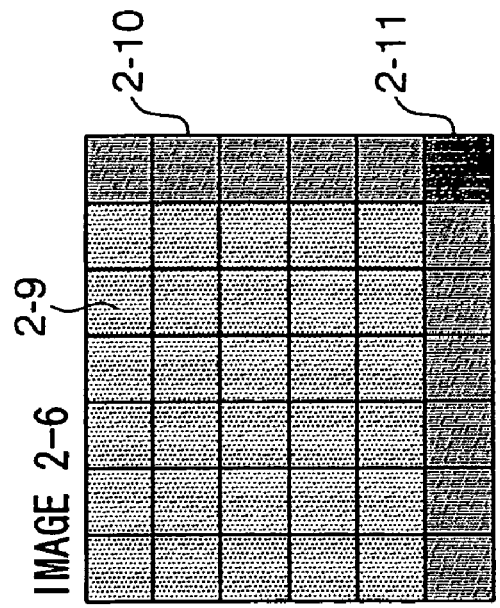
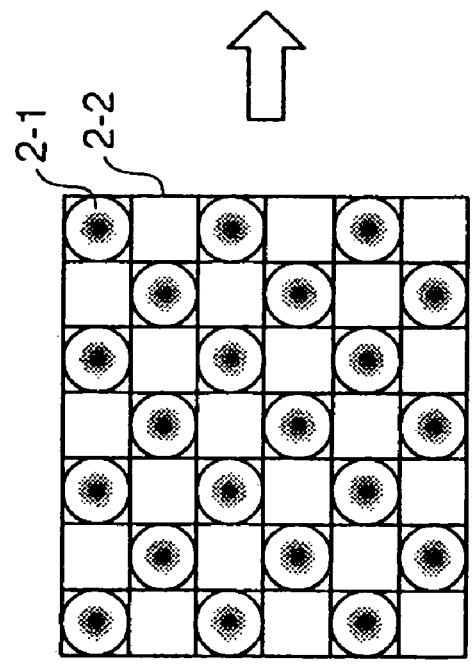
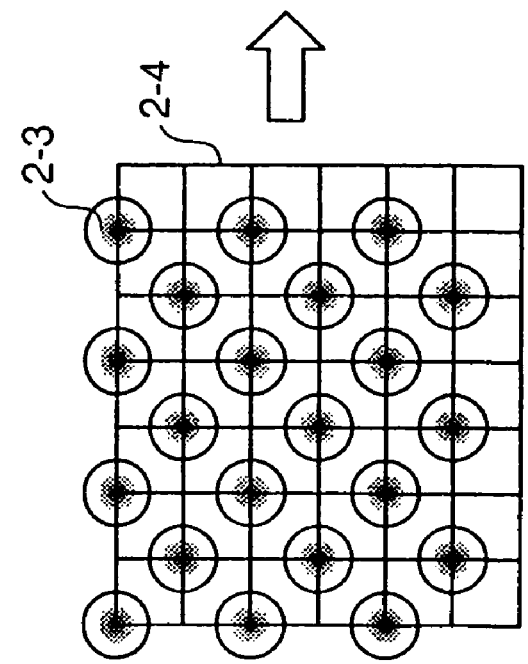
FIG. 2A
FIG. 2B

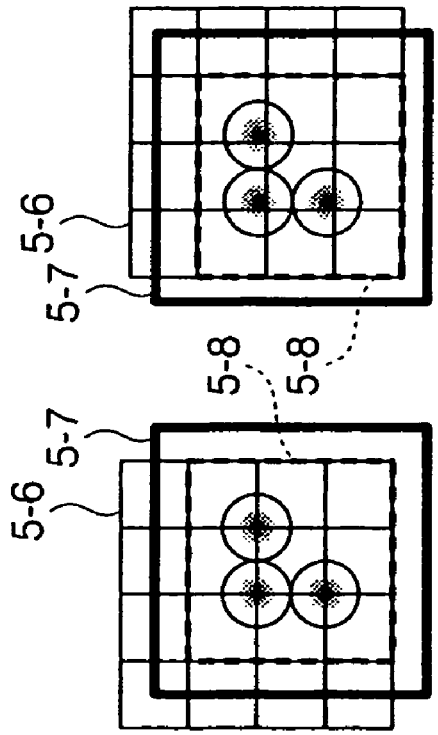
FIG. 5A
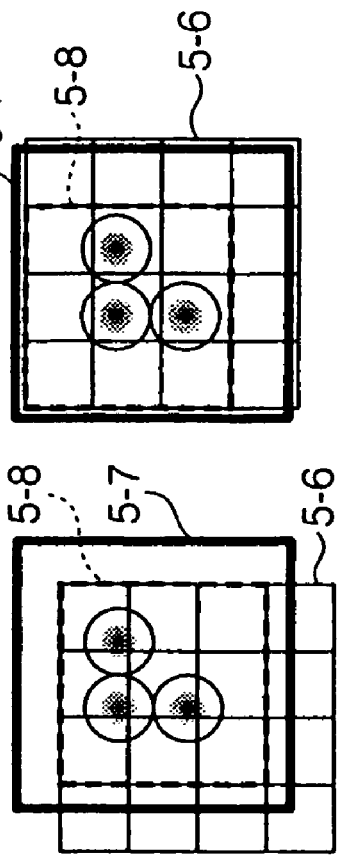
FIG. 5B
FIG. 5C
FIG. 5D
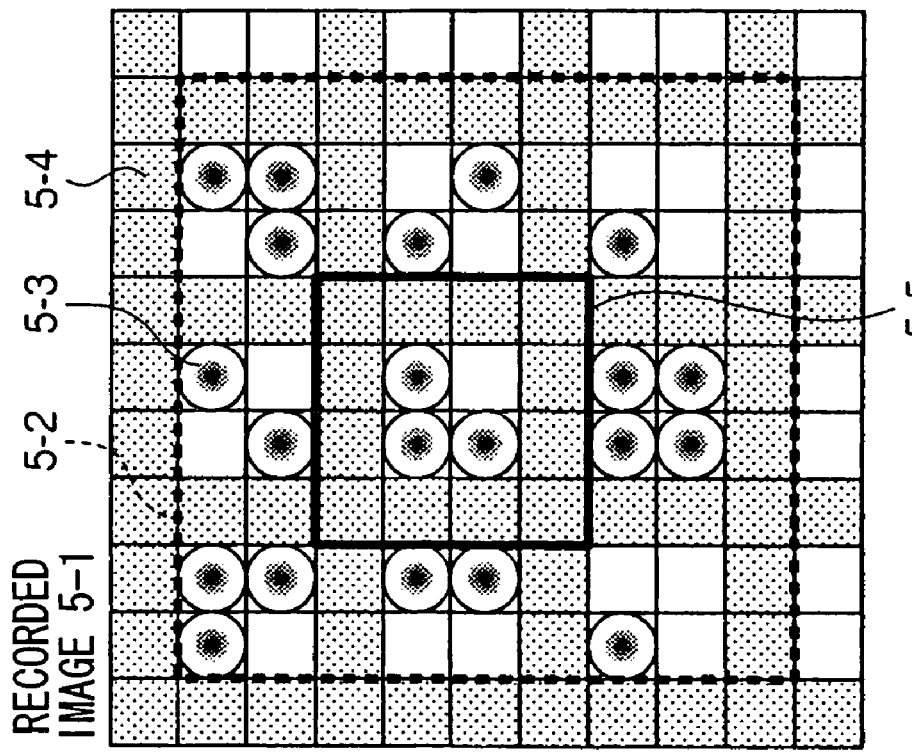
FIG. 5E

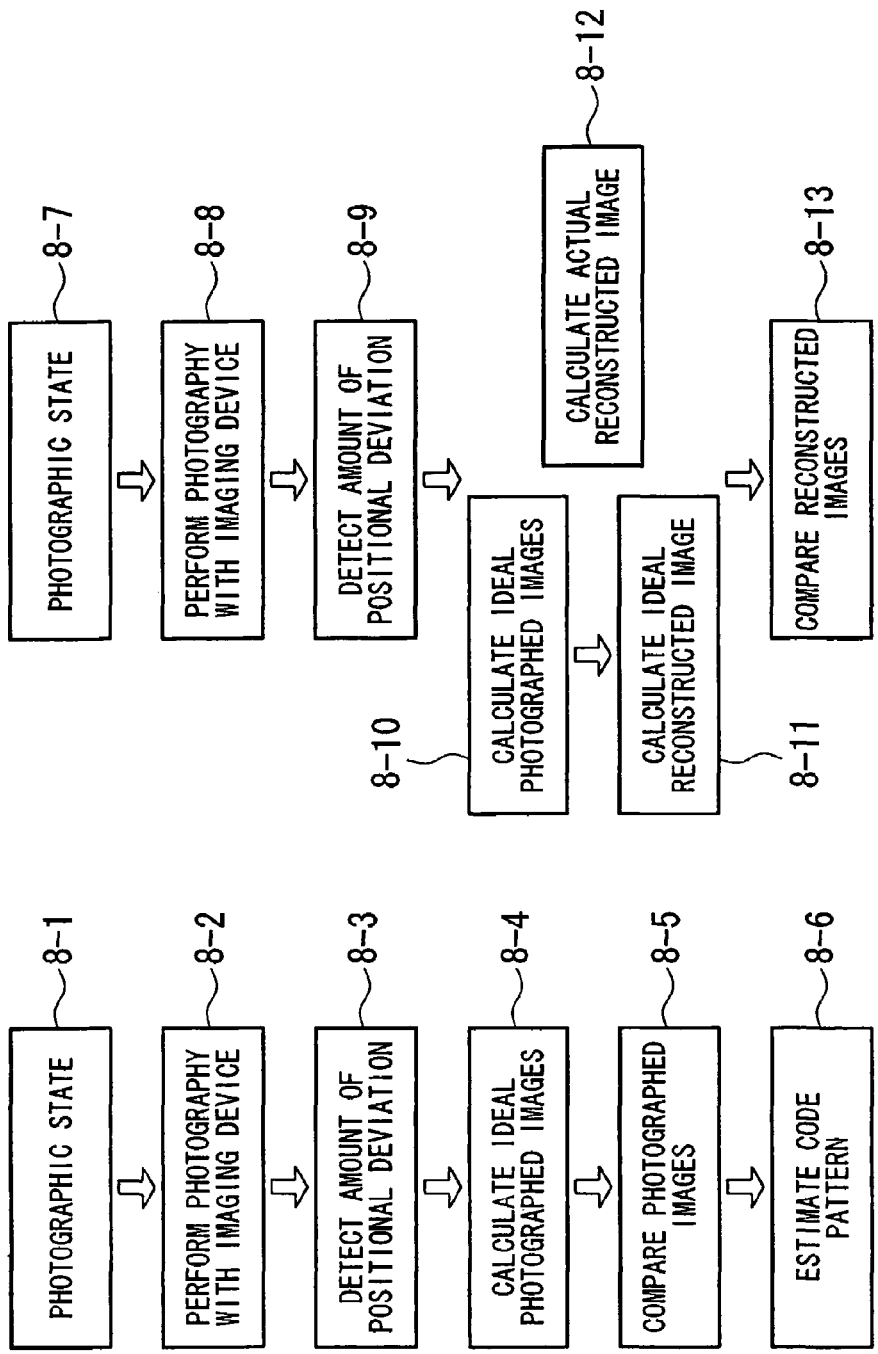
FIG. 8B  SECOND METHOD
FIG. 8A  FIRST METHOD

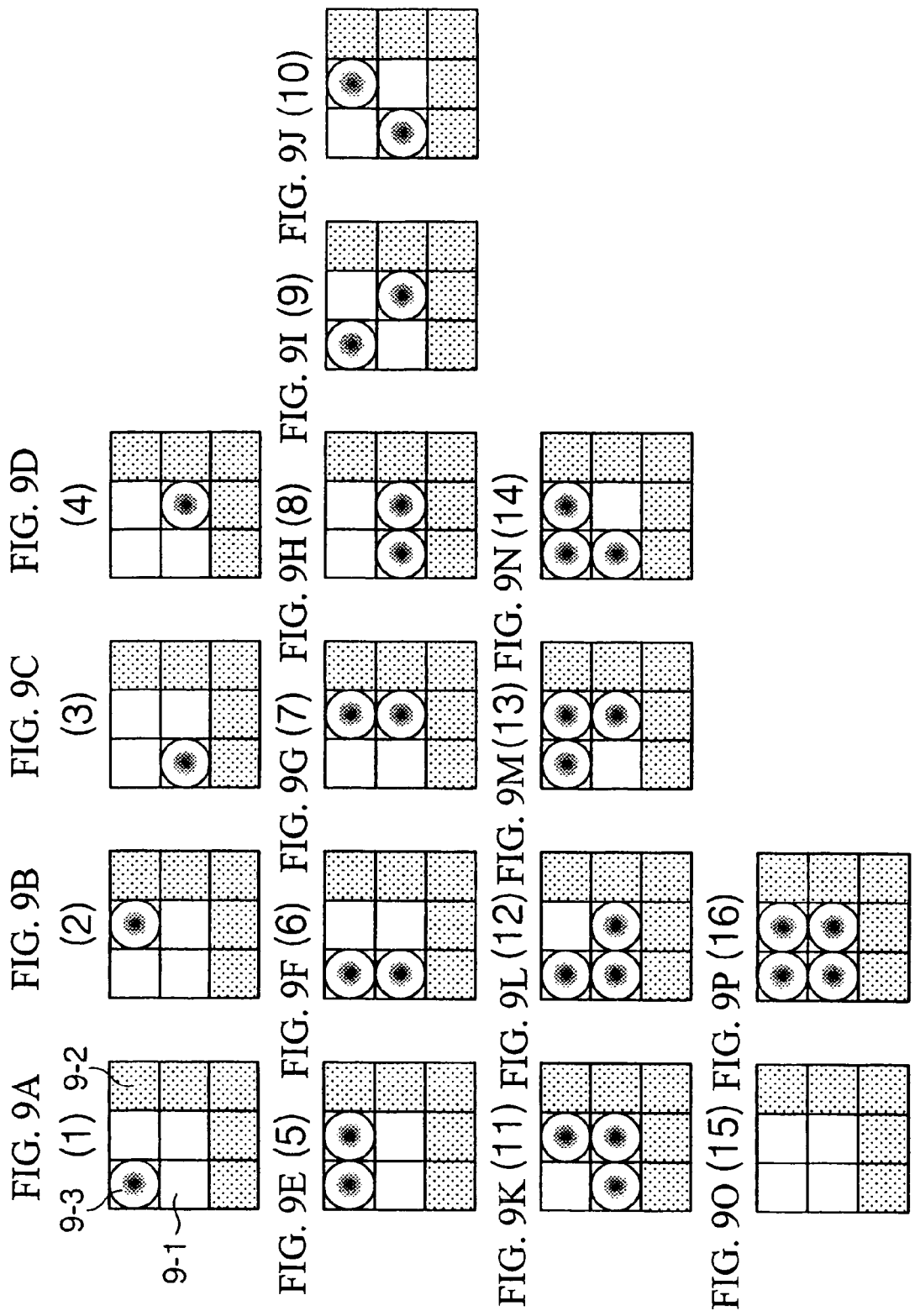

RECORDED IMAGE 10-1

PHOTOGRAPHIC STATE 10-6

PHOTOGRAPHED IMAGE 10-14

INFORMATION CODING APPARATUS, INFORMATION DECODING APPARATUS, AND METHOD AND PROGRAM FOR THE SAME

This application is a National Stage of PCT/JP2004/005090, filed Apr. 8, 2004 and claims priority on Japanese Patent Application No. 2003-104048, filed on Apr. 8, 2003. The disclosure of the above applications are incorporated herein by reference.

TECHNICAL FIELD

The present invention relates to an information coding apparatus, an information decoding apparatus, and a method and program for the same, which are used for optical information recording and reproduction.

Priority is claimed on Japanese Patent Application No. 2003-104048, filed Apr. 8, 2003, the content of which is incorporated herein by reference.

BACKGROUND ART

In the past, for recording information upon a recording medium such as a holographic memory or the like, first the information which is to be recorded is coded into a two-dimensional image, and then this information, coded in the two-dimensional image, is recorded upon a recording medium (a recording material) by using a laser beam or the like as a signal beam or a reference beam.

The original information is then reproduced by, for example, decoding a two-dimensional image which has been obtained by an imaging device by using a laser light beam or the like as a reference beam.

As a method of representing information two-dimensionally in this manner, there is an information coding method of representing 2 bit information by 4×4 pixels (refer to Japanese Unexamined Patent Application, First Publication No. 2002-366014—hereinafter termed Patent Document #1). Furthermore, there is a distortion compensation method of compensating the size of an image which has been detected back to the original image size (refer to Japanese Unexamined Patent Application, First Publication No. 2003-78746—hereinafter termed Patent Document #2).

As is described in these documents, normally, it is often the case that the information is recorded as a binary image made up from black and white. Furthermore, the reproduction of the information which has been recorded is performed by capturing an image with an imaging device such as a CCD (Charge Coupled Device) camera or the like, and by thus reading out the information which is recorded.

When representing information by a two-dimensional image in this manner, if the two-dimensional image is represented as a binary image made up from black and white, the amount of information which can be represented in a two-dimensional image of a given size is, at the maximum, the number of bits corresponding to the number of pixels in that image.

However, since during reproduction the image is captured with an imaging device such as a CCD camera or the like, the pixels of the CCD camera and the pixels of the recorded image deviate from one another, and hence it may happen that the information is not properly read out. Therefore, in practice it is difficult to represent one bit of information with one pixel of the CCD camera.

For example, if a white, a black, a white, and a black pixel are present in that order along a line in the recorded image, then, if this image is captured by the CCD camera in a state in which it has deviated by exactly 0.5 of a pixel, a gray color, which is a color between white and black, is obtained at a CCD pixel which is positioned between a white pixel and a black pixel. Thus, the line consists of a gray, a gray, and a gray pixel is obtained, so that it has become impossible to extract the original information. In other words, when information which is meaningful is arranged at the pixel pitch of the imaging device, it becomes difficult to read it out due to the influence of positional deviation and the like.

Furthermore, as a method of solving this problem, Patent Document #1 proposes a coding method in which two bits of information are represented by 4×4 pixels. However, since this method represents 2 bits by 16 pixels, the coding rate is ⅛, and thus there is the problem that the amount of information which can be recorded is low.

DISCLOSURE OF INVENTION

The present invention has been made in the light of the above circumstances, and its object is to provide an information coding apparatus, an information decoding apparatus, and a method and program for the same, which can represent a large amount of information with a small number of pixels.

This invention is made in order to solve the above-described problems; and an information coding apparatus according to the present invention comprises a code block conversion unit which codes information bits which are inputted as a block of a two-dimensional image made up from m (where m is a natural number)×n (where n is a natural number) pixels, wherein the code block conversion unit arranges pixels which represent the information bits in a code area, which is an area of (m−o)×(n−p) pixels within a code block of m×n pixels (where o and p are natural numbers which satisfy 0<o<m and 0<p<n); and arranges no pixels which represent the information bits in a guide area, which is an area other than the code area within the code block of m×n pixels.

Furthermore, an information coding apparatus according to the present invention comprises a code block conversion unit which codes information bits which are inputted as a block of a two-dimensional image made up from m (where m is a natural number)×n (where n is a natural number) pixels, wherein the code block conversion unit arranges pixels which represent the information bits in a code area, which is an area of (m−o)×(n−p) pixels within a code block of m×n pixels (where o and p are natural numbers which satisfy 0<o<m and 0<p<n); and arranges pixels which represent predetermined information bits in a guide area, which is an area other than the code area within the code block of m×n pixels.

Furthermore, in the above-described information coding apparatuses, the code block conversion unit may determine the size and the position of a pixel representing the information bits which is arranged in the code area which is the area of (m−o)×(n−p) pixels, based upon the size of the code area so that the pixel which represents the information bits is completely included in the code area.

Furthermore, an information decoding apparatus according to the present invention comprises: a code pattern estimation unit which receives input of a photographed image which has been obtained by photographing a two-dimensional image which consists of an area of m×n pixels with an imaging device, in which a single code block comprises a code area in which (m−o)×(n−p) pixels which represent information bits (where m and n are natural numbers, and o and p are natural numbers which satisfy 0<o<m and 0<p<n) are arranged, and a guide area in which no pixels which represent the information bits are arranged, and which estimates a code pattern of the code block based upon the result of relative comparison between the photographed image and ideal photographed images which are calculated based upon the positional relationship between the two-dimensional image and the imaging device; and a bit string reconstruction unit which decodes the information bits corresponding to each code block of the photographed image which is inputted based upon the result of the estimation of the pattern.

Furthermore, in the above-described information decoding apparatus, there may be further included: a positional deviation amount detection unit which detects an amount of positional deviation between pixels of the two-dimensional image and pixels of an imaging device, based upon the photographed image which has been photographed by the imaging device; an ideal photographed image calculation unit which calculates ideal photographed images of code blocks which are photographed by the imaging device corresponding to all the code patterns based upon the amount of positional deviation which has been detected; and an image comparison unit which compares together the photographed image which is inputted and the ideal photographed images which have been calculated, and calculates relative values, and wherein the code pattern estimation unit estimates the code pattern of the code block from the relative values which have been calculated.

Furthermore, in the above-described information decoding apparatus, there may be further included: a positional deviation amount detection unit which detects an amount of positional deviation between pixels of the two-dimensional image and pixels of the imaging device, based upon the which has been photographed by the imaging device; an ideal photographed image calculation unit which calculates ideal photographed images of code blocks which are photographed by the imaging device corresponding to all the code patterns based upon the amount of positional deviation which has been detected; an ideal reconstructed image calculation unit which calculates ideal reconstructed images of code blocks corresponding to all the code patterns based upon the ideal photographed images which have been calculated, and the amount of positional deviation which has been detected; a reconstructed image calculation unit which calculates a reconstructed image of the two-dimensional image from the photographed image, based upon the amount of positional deviation which has been detected; and an image comparison unit which compares together the reconstructed image which has been calculated from the photographed image and the ideal reconstructed images which have been calculated from the code blocks, and calculates relative values, and wherein the code pattern estimation unit may estimate the code pattern of the code block from the relative values which have been calculated.

Furthermore, an information coding method according to the present invention codes information bits which are inputted as a block of a two-dimensional image made up from m (where m is a natural number)×n (where n is a natural number) pixels, and the method comprises the steps of: arranging pixels which represent the information bits in a code area, which is an area of (m−o)×(n−p) pixels within a code block of m×n pixels (where o and p are natural numbers which satisfy 0<o<m and 0<p<n); and arranging no pixels which represent the information bits in a guide area, which is an area other than the code area within the code block of m×n pixels.

Furthermore, an information coding method according to the present invention codes information bits which are inputted as a block of a two-dimensional image made up from m (where m is a natural number)×n (where n is a natural number) pixels, and the method comprises the steps of: arranging pixels which represent the information bits in a code area, which is an area of (m−o)×(n−p) pixels within a code block of m×n pixels (where o and p are natural numbers which satisfy 0<o<m and 0<p<n), and arranging pixels which represent predetermined information bits in a guide area, which is an area other than the code area within the code block of m×n pixels.

Furthermore, in the above-described information coding methods, the size and the position of a pixel representing the information bits which is arranged in the code area which is the area of (m−o)×(n−p) pixels may be determined based upon the size of the code area so that the pixel which represents the information bits is completely included in the code area.

Furthermore, the information decoding method according to the present invention comprises the steps of: receiving input of a photographed image which has been obtained by photographing a two-dimensional image which consists of an area of m×n pixels with an imaging device, in which a single code block comprises a code area in which (m−o)×(n−p) pixels which represent information bits (where m and n are natural numbers, and o and p are natural numbers which satisfy 0<o<m and 0<p<n) are arranged, and a guide area in which no pixels which represent the information bits are arranged; estimating a pattern of the code block based upon the result of relative comparison between the photographed image and ideal photographed images which are calculated based upon the positional relationship between the two-dimensional image and the imaging device; and decoding the information bits corresponding to each code block of the photographed image which is inputted based upon the result of the estimation of the pattern.

Furthermore, the above-described information decoding method may further comprise the steps of: detecting an amount of positional deviation between pixels of the two-dimensional image and pixels of the imaging device, based upon the photographed image which has been photographed by the imaging device; calculating ideal photographed images of code blocks which are photographed by the imaging device corresponding to all the code patterns based upon the amount of positional deviation which has been detected; comparing together the photographed image which is inputted and the ideal photographed images which have been calculated, and calculating relative values; and estimating the code pattern of the code block from the relative values which have been calculated.

Furthermore, the above-described information decoding method may further comprise the steps of: detecting an amount of positional deviation between pixels of the two-dimensional image and pixels of the imaging device, based upon the photographed image which has been photographed by the imaging device; calculating ideal photographed images of code blocks which are photographed by the imaging device corresponding to all the code patterns based upon the amount of positional deviation which has been detected; calculating ideal reconstructed images of all the code blocks corresponding to all the code patterns based upon the ideal photographed images which have been calculated, and the amount of positional deviation which has been detected; calculating a reconstructed image of the two-dimensional image from the photographed image based upon the amount of positional deviation which has been detected; comparing together the reconstructed image which has been calculated from the photographed image and the ideal reconstructed images which have been calculated from the code blocks, and calculating relative values; and estimating the code pattern of the code block from the relative values which have been calculated.

An information coding program according to the present invention is an information coding program which causes a computer to execute a coding process of coding information bits which are inputted as a block of a two-dimensional image made up from m (where m is a natural number)×n (where n is a natural number) pixels, the coding process comprising the steps of: arranging pixels which represent the information bits in a code area, which is an area of (m−o)×(n−p) pixels within a code block of m×n pixels (where o and p are natural numbers which satisfy 0<o<m and 0<p<n); and arranging no pixels which represent the information bits in a guide area, which is an area other than the code area within the code block of m×n pixels.

Furthermore, an information coding program according to the present invention is an information coding program which causes a computer to execute a coding process of coding information bits which are inputted as a block of a two-dimensional image made up from m (where m is a natural number)×n (where n is a natural number) pixels, the coding process comprising the steps of: arranging pixels which represent the information bits in a code area, which is an area of (m−o)×(n−p) pixels within a code block of m×n pixels (where o and p are natural numbers which satisfy 0<o<m and 0<p<n); and arranging pixels which represent predetermined information bits in a guide area, which is an area other than the code area within the code block of m×n pixels.

In the coding process, the size and the position of a pixel representing the information bits which is arranged in the code area which is the area of (m−o)×(n −p) pixels may be determined based upon the size of the code area so that the pixel which represents the information bits is completely included in the code area.

An information decoding program according to the present invention causes a computer to execute: a process of receiving input of a photographed image which has been obtained by photographing a two-dimensional image which consists of an area of m×n pixels with an imaging device, in which a single code block comprises a code area in which (m−o)×(n−p) pixels which represent information bits (where m and n are natural numbers, and o and p are natural numbers which satisfy 0<o<m and 0<p<n) are arranged, and a guide area in which no pixels which represent the information bits are arranged, and of estimating a pattern of the code block based upon the result of relative comparison between the photographed image and ideal photographed images which are calculated based upon the positional relationship between the two-dimensional image and the imaging device; and a process of decoding the information bits corresponding to each code block of the photographed image which is inputted based upon the result of the estimation of the pattern.

In the above described information coding program, the computer may further be caused to execute: a process of detecting an amount of positional deviation between pixels of the two-dimensional image and pixels of the imaging device, based upon the photographed image which has been photographed by the imaging device; a process of calculating ideal photographed images of code blocks which are photographed by the imaging device corresponding to all the code patterns based upon the amount of positional deviation which has been detected; a process of comparing together the photographed image which is inputted and the ideal photographed images which have been calculated, and calculating relative values; and a process of estimating the pattern of the code block from the values which have been calculated.

In the above described information coding program, the computer may further be caused to execute: a process of detecting an amount of positional deviation between pixels of the two-dimensional image and pixels of the imaging device, based upon the photographed image which has been photographed by the imaging device; a process of calculating ideal photographed images of code blocks which are photographed by the imaging device corresponding to code patterns based upon the amount of positional deviation which has been detected; a process of calculating ideal reconstructed images of code blocks corresponding to all the code patterns based upon the ideal photographed images which have been calculated, and the amount of positional deviation which has been detected; a process of calculating a reconstructed image of the two-dimensional image from the photographed image based upon the amount of positional deviation which has been detected; a process of comparing together the reconstructed image which has been calculated from the photographed image and the ideal reconstructed images which have been calculated from the code blocks, and calculating relative values; and a process of estimating the code pattern of the code block from the relative values which have been calculated.

As has been explained above, when coding the information bits which are inputted as the two-dimensional image block made up from m (where m is a natural number)×n (where n is a natural number) pixels, the present invention arranges the pixels which represent the information bits in the code area, which is the area of (m−o)×(n−p) pixels within the code block of m×n pixels (where o and p are natural numbers which satisfy 0<o<m and 0<p<n), and arranges no pixels which represent the information bits in the guide area, which is the area of the other pixels within the code block of m×n pixels. Accordingly, in whatever manner the code blocks may be arranged in the two-dimensional image, the code areas are not arranged so as to be adjacent to one another, so that it is possible reliably to separate the code blocks.

Furthermore, when coding the information bits which are inputted as the two-dimensional image block made up from m (where m is a natural number)×n (where n is a natural number) pixels, the present invention arranges the pixels which represent the information bits in the code area, which is the area of (m−o)×(n−p) pixels within the code block of m×n pixels (where o and p are natural numbers which satisfy 0<o<m and 0<p<n), and arranges the pixels which represent predetermined information bits in the guide area, which is the area of the other pixels within the code block of m×n pixels. Accordingly, in whatever manner the code blocks may be arranged in the two-dimensional image, the code areas are not arranged so as to be adjacent to one another, so that it is possible reliably to separate the code blocks. In addition, since the information bits which are arranged in the guide are already known, it is possible to perform the decoding reliably by applying compensation corresponding to this.

Furthermore, the present invention determines the size and the position of the pixel which is arranged in the area of (m−o)×(n−p) pixels based upon the size of the area of (m−o)× (n−p) pixels. Accordingly, in whatever manner the code blocks may be arranged in the two-dimensional image, the code areas are not arranged so as to be adjacent to one another, so that it is possible reliably to separate the code blocks; and also it is possible to design the coding with a high degree of freedom according to the needs of the user and the characteristics of the recording medium.

Furthermore, the present invention receives input of the photographed image of the two-dimensional image which consists of the area of m×n pixels, in which a single code block comprises a code area in which (m−o)×(n−p) pixels which represent information bits (where m and n are natural numbers, and o and p are natural numbers which satisfy 0<o<m and 0<p<n) are arranged, and a guide area in which no pixels which represent the information bits are arranged, estimates the pattern of the code block based upon the result of the relative comparison between the photographed image and the image in the ideal state, and decodes the information bits based upon the result of the estimation of the pattern. Accordingly, it is possible to estimate the recorded code pattern, and it is possible to decode the information which has been coded at high density with good efficiency.

Furthermore, the present invention calculates the amount of positional deviation between the pixels of the two-dimensional image and the pixels of the imaging device is detected, calculates the ideal photographed image of a code block corresponding to a code pattern based upon the amount of positional deviation which has been detected, compares together the photographed image which is inputted and the ideal photographed image which has been calculated, calculates the relative value, and estimates the pattern of the code block from the relative value which has been calculated. Accordingly, it is possible to estimate the recorded code pattern, and it is possible to decode the information which has been coded at high density with good efficiency.

Furthermore, the present invention detects the amount of positional deviation between the pixels of the two-dimensional image and the pixels of the imaging device, calculates the ideal photographed image of a code block corresponding to a code pattern based upon the amount of positional deviation which has been detected, calculates the ideal reconstructed image of the code block based upon the ideal photographed image which has been calculated, and the amount of positional deviation which has been detected, calculates the reconstructed image of the two-dimensional image from the photographed image based upon the amount of positional deviation which has been detected, compares together the reconstructed image which has been calculated from the photographed image and the reconstructed image which has been calculated from the code block, calculates the relative value; and estimates the pattern of the code block from the relative value which has been calculated. Accordingly, it is possible to estimate the recorded code pattern, and it is possible to decode the information which has been coded at high density with better efficiency.

BRIEF DESCRIPTION OF DRAWINGS

FIGS. 2A and 2B are figures for explanation of a method of capturing a recorded image.

FIGS. 5A through 5E are figures for explanation of a method of separating code blocks.

FIGS. 8A and 8B are figures for explanation of decoding steps.

FIGS. 9A through 9P are figures for explanation of a code block.

BEST MODE FOR CARRYING OUT THE INVENTION

Figure 1:
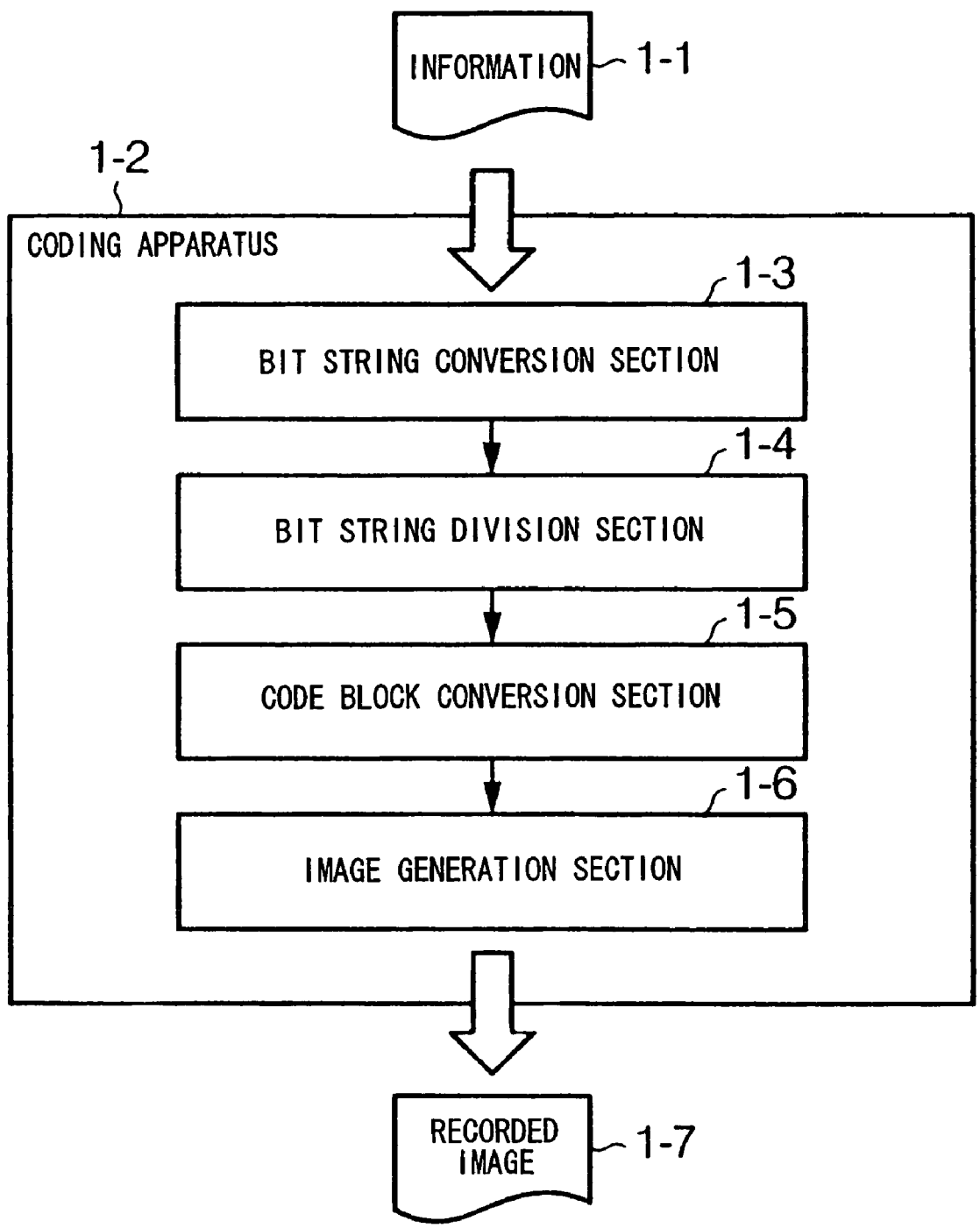
FIG. 1 is a figure for explanation of the flow of coding.

In the following, preferred embodiments of the present invention will be described with reference to the drawings; but the present invention is not to be considered as being limited to the embodiments below.

First, the fundamental idea of the present invention will be explained.

For example, now, it will be supposed that the value of a pixel in a two-dimensional image is represented in 256 steps, from 0 to 255. Furthermore, it will be supposed that the pixel value 0 denotes black and that the pixel value 255 denotes white.

This is a definition formulated for the convenience of explanation; no special meaning is to be attributed to the numbers, or to white or black.

When converting information into a two-dimensional image, the digital bit string for the information is not converted into the image without modification, but rather is divided up into bit strings of an appropriate length, and each of these bit strings is converted into a code block, and these code blocks are arranged so as to form a two-dimensional image.

At this time, when the code blocks are arranged close together, it may happen that some pixel of a code block may exert some influence upon an adjacent code block, and in this case it becomes impossible to separate the code blocks with good efficiency.

To address this problem, pixels which have determinate pixel values are disposed between mutually adjacent code blocks.

Now, as one example, a code block will be considered which is made up from 3×3 pixels, i.e., from 9 pixels. In this code block, 2×2 pixels, i.e., 4 pixels, are used as a code area which records the actual information, and the remaining 5 pixels are used as a guide area. In the code area, information is represented by disposing appropriate pixel values, while, in the guide area, the pixel value is set to a determinate value, for example 0. It should be understood that, to speak as a generalization, if the code block is formed to consist of a pixel area which is m (where m is a natural number)×n (where n is a natural number) of pixels, then the code area is taken as being the pixel area (m−o)×(n−p) (where o and p are natural numbers which satisfy 0<o<m and 0<p<n), and the remaining area is taken as being the guide area.

By doing so, 1 pixel guide area is certainly present between one code area and another, whatever may be the arrangement of the 3×3 pixel code blocks, and accordingly it becomes possible to separate the code blocks from one another.

Furthermore, if m=3, n=3, o=1, and p=1, then, the code areas can represent 4 bits of information at a maximum, accordingly the coding rate is 4/9 at a maximum, so that it becomes possible to represent a larger amount of information with the aforesaid information coding method.

Yet further, the arrangement of the pixel values of the code area can be as desired, so that it can be designed according to the system which performs recording and reproduction.

Even further, the size of the code block can be as desired, so that it can be designed according to the system which performs recording and reproduction.

Next, the code pattern is estimated by comparing the photographed image which has been actually obtained with the ideal photographed images of the code blocks with respect to code patterns, and the coded two-dimensional image is decoded.

A first decoding method is as follows.

First, a two-dimensional image is photographed by the imaging device, and is captured as the photographed image.

Next, the amount of positional deviation between the two-dimensional image and the imaging device is detected, and ideal photographed images are calculated from the code patterns which are the subjects of decoding.

The actual photographed image and the ideal photographed images are then compared together, and the closest pattern is estimated to be the code pattern.

A second decoding method is as follows.

The photographed image is captured in the same manner as in the first method.

Next, the amount of positional deviation between the two-dimensional image and the imaging device is detected.

Next, ideal photographed images are calculated based upon the amount of positional deviation between the two-dimensional image and the imaging device and the code patterns which are the subjects of decoding, and ideal reconstructed images are calculated based upon these ideal photographed images and the amount of positional deviation.

Next, a reconstructed image of the two-dimensional image, in other words an actual reconstructed image, is calculated based upon the amount of positional deviation which has been detected and the photographed image.

This actual reconstructed image and the ideal reconstructed images are then compared together, and the closest pattern is estimated to be the code pattern.

In this connection, with regard to a method for detecting the positional deviation, the applicant of this invention has previously filed Japanese Patent Application No. 2002-247682 (Japanese Unexamined Patent Application, First Publication No. 2003-150898), and, for example, the method described in the specification of that application may be used. That is, a predetermined pattern is recorded in advance within the two-dimensional image, and, when performing the decoding, the rough position of this pattern is detected, and the detailed position of the pattern is detected based upon the rough position which has been detected and a calculated center of gravity of the distribution of the similarity between an area within the photographed image and the pattern. Then, the amount of positional deviation between the two-dimensional image and the imaging device is detected based upon the position of the pattern which is recorded in advance, and the detailed position of the pattern which has been detected during decoding.

In this manner, when code blocks are utilized which are made up of the aforementioned code areas and guide areas, the guide areas are definitely present around the code areas. Accordingly, the pixels of the imaging device which photographs the code areas are, at maximum, 3×3 pixels, and, within these pixel areas, nothing other than the pixels of the code areas exerts any influence upon the pixel values.

Accordingly, it is possible to calculate ideal photographed images and ideal reconstructed images so as to correspond to an actual photographed image and an actual reconstructed image based upon the code patterns which are the subjects and the amount of positional deviation between the two-dimensional image and the imaging device, so that it is possible to estimate the code pattern by comparing together these ideal photographed images and ideal reconstructed images with the actual photographed image and the actual reconstructed image.

It should be understood that the two-dimensional image which is photographed by the imaging device is normally one which is taken out from some kind of medium, or is written upon some kind of medium, and it may happen that a distortion or the like upon the imaging device takes place as it is photographed. In this case, it is effective to employ the second method, and to estimate the code pattern by calculating the reconstructed image in consideration of the positional deviation and the distortion.

Furthermore, if there is no distortion or the like, or if it can be ignored, the first method which can be performed with less calculation will be effective.

In the following, embodiments of the information coding apparatus, the information decoding apparatus, and methods for the same according to the present invention will be explained with reference to the drawings.

EMBODIMENT 1

Coding Apparatus and Method

According to the coding apparatus and the method for the same according to this embodiment, the input information, in other words the bits of information, is coded in a two-dimensional image in which one code block is made up of an area of m×n pixels, having a code area in which (m−o)×(n−p) pixels which represent bits of information (where m and n are natural numbers, and o and p are natural numbers which satisfy 0<o<m and 0<p<n) are disposed, and a guide area in which no pixels which represent bits of information are disposed.

In the following, the coding apparatus and method of this embodiment will be explained with reference to the drawings, for the case in which the values of m, n, o, and p described above are m=3, n=3, o=1, and p=1. It should be understood that these set values are only examples, and the same method could be applied in other cases as well.

FIG. 1 shows the structure of a coding apparatus 1-2 of this embodiment.

The coding apparatus 1-2 of this embodiment comprises a bit string conversion section 1-3, a bit string division section 1-4, a code block conversion section 1-5, and an image generation section 1-6.

The bit string conversion section 1-3 receives input of information 1-1, and performs processing to convert it into a bit string.

The bit string division section 1-4 receives input of the bits of information which have been converted into the bit string, and divides the information bits into predetermined units.

The code block conversion section 1-5 receives input of the bits of information which have been divided into a plurality of units, and codes these bits of information as two-dimensional image blocks which consist of m (where m is a natural number)×n (where n is a natural number) pixels.

At this time, the code block conversion section 1-5 arranges those pixels which represent bits of information in an area of (m−o)×(n−p) pixels (where o and p are natural numbers which satisfy 0<o<m and 0<p<n) within the code block of m×n pixels, and does not arrange any pixels which represent bits of information in the other pixel areas within the code block of m×n pixels. Furthermore, it would also be acceptable to arrange pixels which represent previously determined information bits in an area of the other pixels within the code block of m×n pixels.

Moreover, the sizes and the positions of the pixels which are arranged in this area of (m−o)×(n−p) pixels are determined based upon the size of the area of (m−o)×(n−p) pixels.

The image generation section 1-6 converts the code blocks which have been converted into two-dimensional images to be recorded, and outputs the images.

In other words, the information 1-1 which has been inputted is first converted into a bit string by the bit string conversion section 1-3. This bit string which has been converted is divided by the bit string division section 1-4. These divided bit strings are converted into code blocks by the code block conversion section 1-5. These code blocks which have been converted are converted into images to be recorded by the image generation section 1-6, and are outputted as recorded images 1-7 which have been coded.

A concrete coding method will now be explained in the following.

Now let it be supposed that the image to be recorded consists of bright points (so-called bright spots), and when it is photographed with the CCD, an image is captured such that the area where the bright spot is present becomes white, while the area where the bright spot is not present becomes black. Here, this is a matter which is defined for the purposes of the explanation; there is no special meaning to the allotment of white and black.

This situation is shown in FIGS. 2A and 2B. The images which are to be recorded consist of the bright spots 2-1 and 2-3, and the respective pixels of the CCD are represented by lattices as shown by 2-2 and 2-4. In addition, the images which are captured by the CCD are as in 2-5 and 2-6.

At this time, as shown in FIG. 2A, the bright spot 2-1 and the pixel 2-2 of the CCD are exactly in register, and a reproduced image 2-5 results in which the areas where the bright spots are present are represented as white (2-7), while the areas where no bright spots are present are represented as black (2-8). On the other hand, in the case of FIG. 2B, the bright spots 2-3 and the pixels 2-4 of the CCD are located as deviated from one another, so that, in this situation, when photography is performed, the reproduced image 2-6 results which is made up by the pixels 2-9, 2-10, and 2-11, and it is not possible to reconstruct the original situation.

To this purpose, a recorded image is generated from the information to be recorded in accordance with the coding method of this embodiment.

Figure 3B:
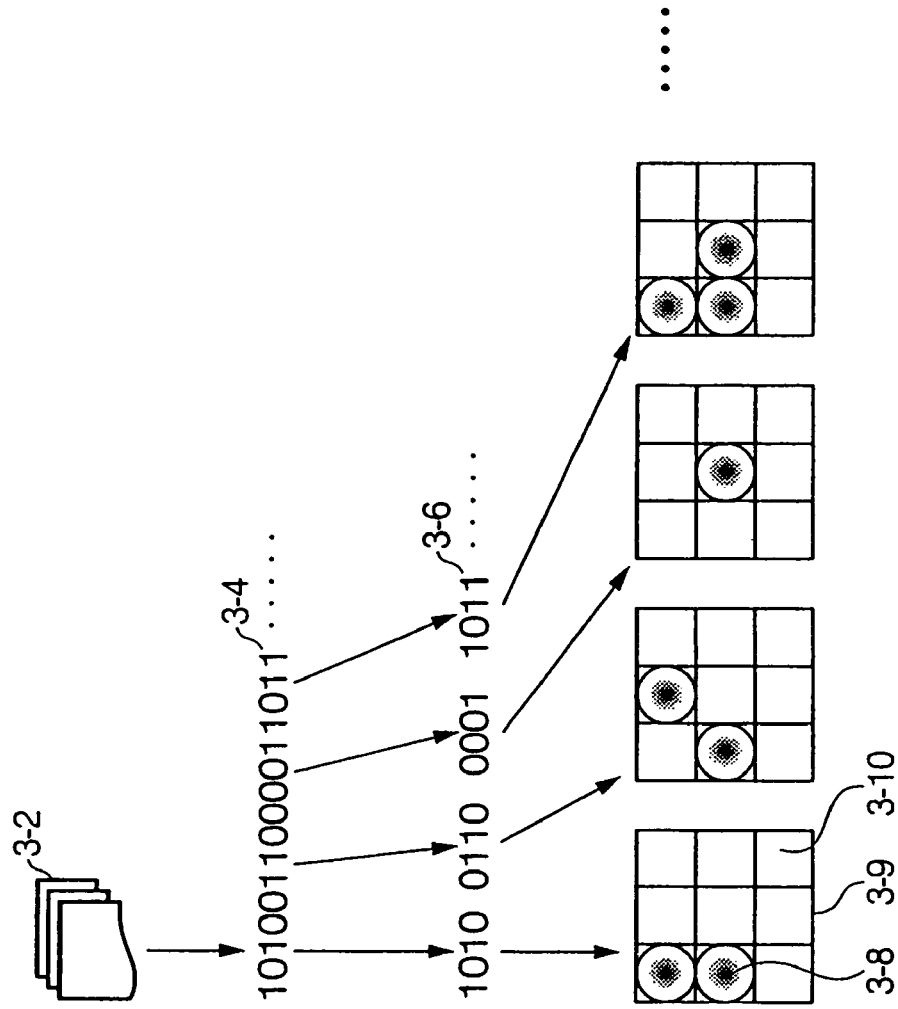
FIGS. 3A and 3B are figures for explanation of a coding procedure.
Figure 3A:
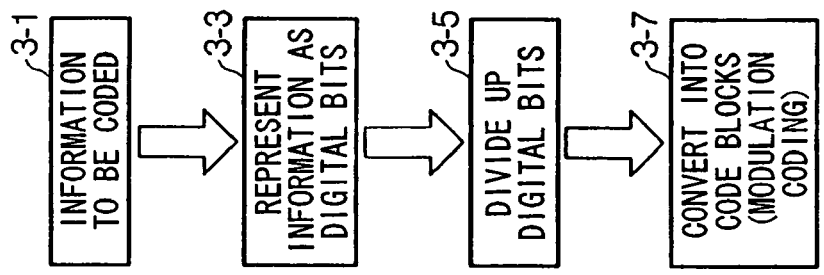

FIGS. 3A and 3B are figures for explanation of this coding procedure. As shown in FIGS. 3A and 3B, the information coding apparatus represents the information which is to be coded (3-1) as digital bits (3-3), divides these digital bits up into bit strings which correspond to code blocks (3-5), and performs coding for each of these bit strings (3-7).

Specifically, information 3-2 is represented as digital bits 3-4, and this is divided at a predetermined length, so as to generate bit strings 3-6.

The length of each of these bit strings is determined by how many bit strings are to be represented with a single code block. Here, the example is shown of coding 4 bits into a single code block.

These bit strings 3-6 are then coded into the code blocks 3-9. Here, it is supposed that the code block 3-9 comprises a bright spot 3-8, and that no bright spot is arranged in the area (3-10) in which nothing is present.

Figure 4:
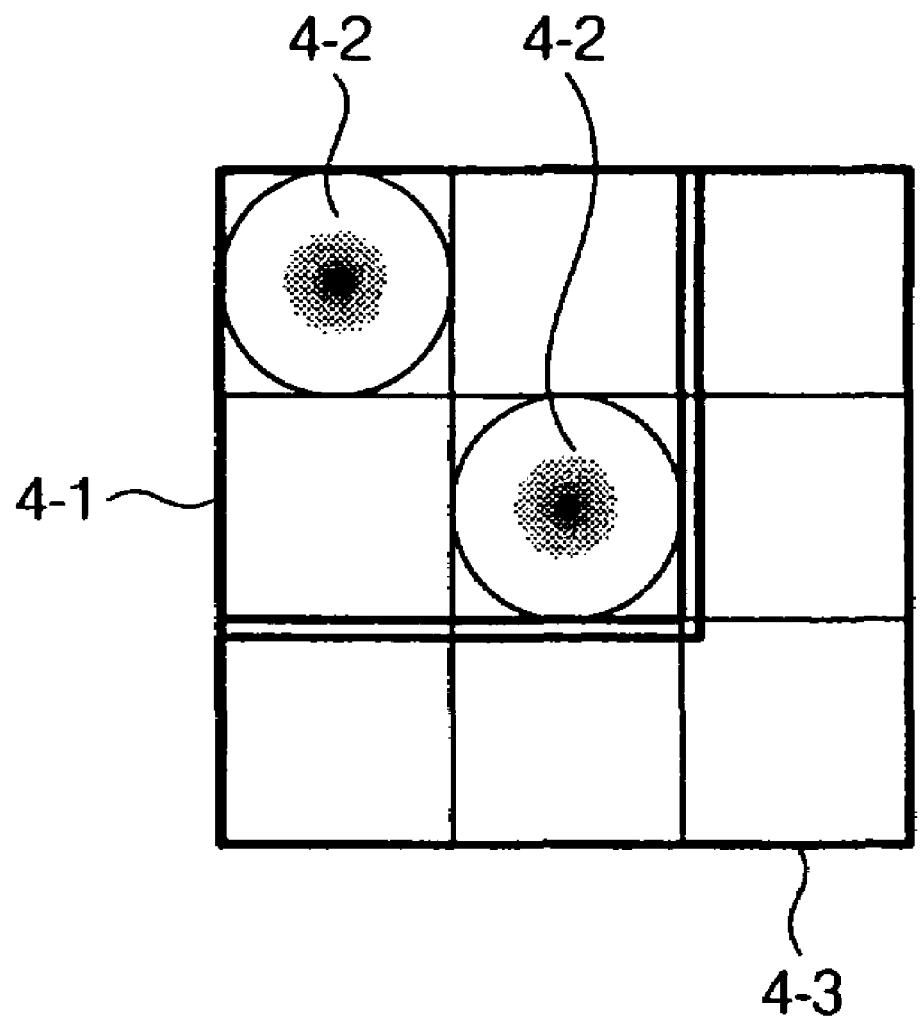
FIG. 4 is a figure for explanation of the structure of a code block.

At this time, it would also be acceptable to freely determine the number of bright spots per one bit string, arrangement methods such as the pattern of bright spots, and the length of the bit strings which is represented by one code block. However, the code block follows the structure as shown in FIG. 4. In other words, it is supposed that the sizes and positions of the pixels which are arranged in the area of (m−o)×(n−p) pixels is determined based upon the size of the area of (m−o)×(n−p) pixels.

The code block consists of a code area 4-1 and a guide area 4-3. In other words, a single code block consists of an m×n pixel area which includes a code area in which (m−o)×(n−p) pixels (where m and n are natural numbers, and o and p are natural numbers which satisfy 0<o<m and 0<p<n) which represent information bits are arranged, and a guide area in which no pixels which represent information bits are arranged. Thus, in this case, the information to be recorded is represented by the code area.

Now, suppose that a bright spot is arranged like, for example, 4-2. In other words, the bright spot can be freely arranged within the code area 4-1, while the guide area is constituted by a determinate pattern. This figure shows a pattern in which no bright spot is arranged in the guide area.

By making the code block in this manner, no code areas are ever arranged so as to be adjacent to one another, no matter in what manner the code blocks may be arranged upon the two-dimensional image.

This is the reason that it is possible to separate the code blocks.

Finally, the images which have been converted into code blocks are arranged, and the recorded image is generated.

FIGS. 5A through 5E show the separation of the code blocks upon the recoded image.

As shown in FIG. 5E, the recorded image 5-1 consists of 9 code blocks 5-2, and each of these code blocks includes bright spots 5-3. Furthermore, the colored area 5-4 represents the guide area.

Here, the reproduction by the CCD for the area 5-5 at the central area will be considered. An area 5-7 shows an example of the extracted area 5-5. 5-6 denotes the pixels of the CCD. According to the degree of deviation of the CCD pixels 5-6 with respect to the area 5-7, FIGS. 5A through 5D are considered.

In this case, the area 5-8 of the CCD pixels which includes bright spots does not definitely include any bright spots other than those at the code area, i.e., at its central area. Accordingly, it is possible to observe the pattern of the bright spot only in the local area which is limited to the area 5-8, so that it becomes possible to separate and deal with each code block.

Figure 6A:
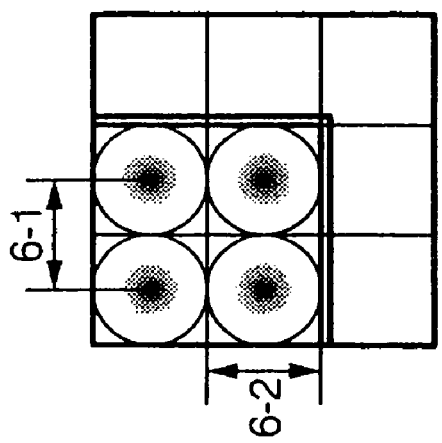
FIGS. 6A through 6D are figures for explanation of the size and the position of a bright spot.
Figure 6B:
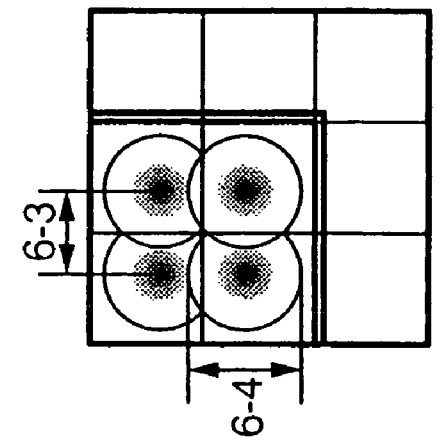
Figure 6C:
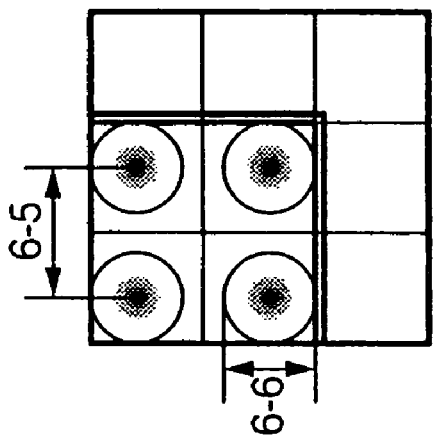
Figure 6D:
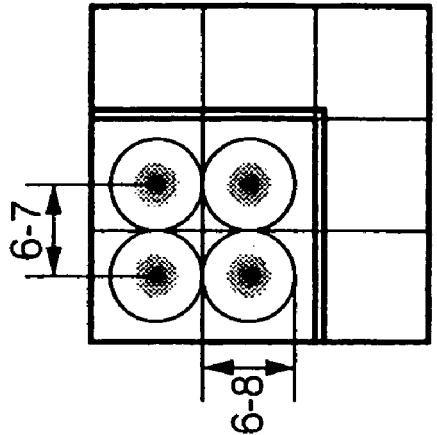

In FIGS. 6A through 6D, the size and the position of the bright spot which is disposed within the code block are explained. In FIG. 6A, four bright spots are arranged within the code block, and the bright spots are formed as circles, and the size 6-2 of the bright spots is the same as the size of the pixels. Furthermore, the pitch 6-1 of the bright spots is the same as the pitch of the pixels. According to the reading out method, bright spots may be arranged as shown in FIGS. 6B, 6C, or 6D; the pitch of the bright spots may be any of 6-3, 6-5, and 6-7, and the size of the bright spots may be any of 6-4, 6-6, and 6-8.

In FIG. 6B, the size 6-4 of the bright spots is the same, but the pitch 6-3 of the bright spots is smaller than the pixel pitch.

In FIG. 6C, the size 6-6 of the bright spots is made smaller, but the pitch 6-5 of the bright spots is made to be larger than the pixel pitch.

In FIG. 6D, the size 6-8 of the bright spots and the pitch 6-7 of the bright spots are both made to be smaller.

It should be understood that it would be acceptable to arrange the bright spots by some other method. In other words, since it becomes possible to separate the code blocks during reproduction provided that the bright spots are kept within the code areas, accordingly it will be acceptable to arrange the bright spots freely within the code areas.

Furthermore, apart from the shapes or the sizes of the bright spots, it would also be acceptable to vary the brightness distribution of the arranged bright spots, provided that they are kept within the code areas.

EMBODIMENT 2

Decoding Apparatus and Method

According to the decoding apparatus and method of this embodiment, in response to input of a photographed image, which is a photographed two-dimensional image made up of an area of m×n pixels in which one code block has a code area in which (m−o)×(n−p) pixels which represent bits of information (where m and n are natural numbers, and o and p are natural numbers which satisfy 0<o<m and 0<p<n) are arranged, and a guide area in which no pixels which represent information bits are arranged, the information bits of the photographed image which are inputted are decoded.

In the following, the decoding apparatus and method for the same according to this embodiment will be explained with reference to the drawings, for the case in which the values of m, n, o, and p described above are m=3, n=3, o=1, and p=1. It should be understood that the same method could be applied in other cases as well.

Now let it be supposed that the recorded image includes bright points (so-called bright spots), and when it is photographed with the CCD, an image is captured such that the portion where the bright spot is present becomes white, while the portion where the bright spot is not present becomes black. Here, this is a matter which is defined for the purposes of the explanation; there is no special meaning to the allotment of white and black.

Figure 7A:
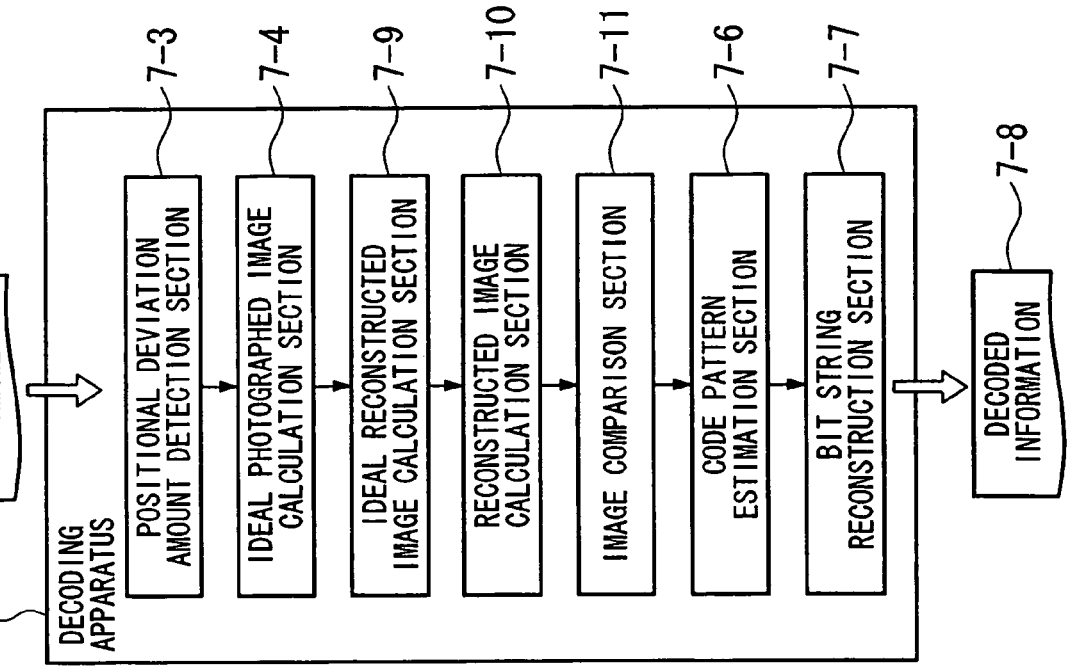
FIGS. 7A and 7B are figures for explanation of the flow of decoding.
Figure 7B:
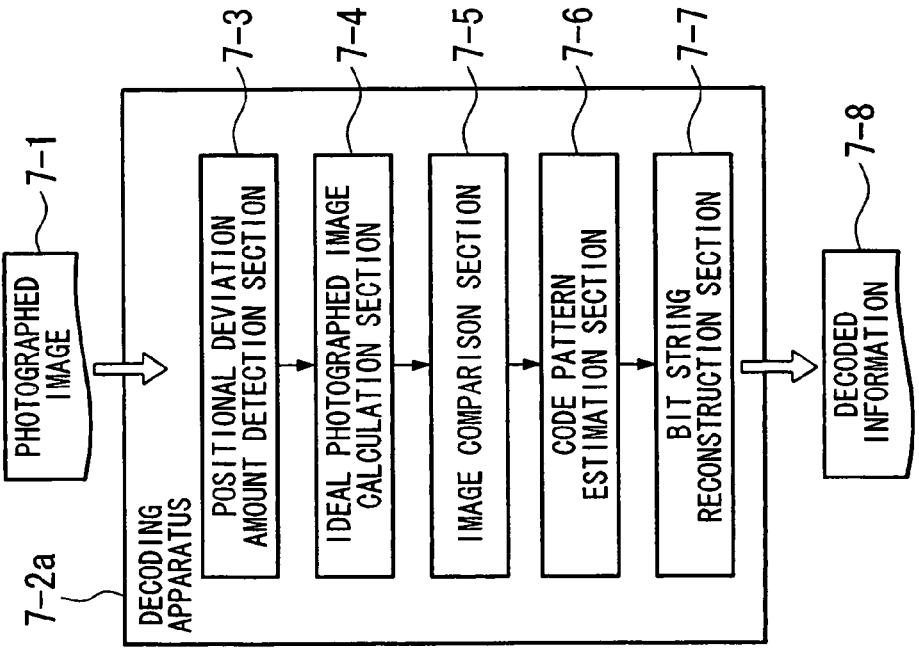

FIGS. 7A and 7B show the structures of two types of decoding apparatus 7-2a and 7-2b, as examples of the structure of the decoding apparatus according to this embodiment. As shown in FIG. 7A, the decoding apparatus 7-2a of this embodiment comprises a positional deviation amount detection section 7-3, an ideal photographed image calculation section 7-4, an image comparison section 7-5, a code pattern estimation section 7-6, and a bit string reconstruction section 7-7.

The positional deviation amount detection section 7-3 detects the amount of positional deviation between the two-dimensional image which has been coded and the imaging device.

The ideal photographed image calculation section 7-4 calculates ideal photographed images, based upon the amount of positional deviation which has been detected. Here, by the ideal photographed images, are meant photographed images of the code blocks for all the code patterns which are used by the code block conversion section 1-5 in the coding apparatus.

The image comparison section 7-5 compares together the ideal photographed images which have been calculated by the ideal photographed image calculation section 7-4 and the actual photographed image 7-1. Here, in concrete terms, this comparison by the image comparison section 7-5 means, for example, the calculation of a relative value (for example, similarity) between the photographed image which has been inputted and the ideal photographed images which have been calculated, as will be described hereinafter.

The code pattern estimation section 7-6 estimates the pattern of the code block, based upon the relative value which is calculated by the image comparison section 7-5. For example, the code pattern inference section 7-6 estimates that the pattern which has the highest similarity, as calculated by the image comparison section 7-5, is the pattern of the code block.

The bit string reconstruction section 7-7 decodes the information bits, based upon the result of pattern estimation, and outputs it.

In other words, when a photographed image 7-1 of a two-dimensional image which has been coded is inputted to the decoding apparatus 7-2a, first, the amount of positional deviation between the two-dimensional image and the imaging device is detected by the positional deviation amount detection section 7-3. Next: ideal photographed images are calculated by the ideal photographed image calculation section 7-4 based upon the amount of positional deviation which has been detected; these ideal photographed images which have been calculated and the actual photographed image 7-1 are compared together by the image comparison section 7-5; a code pattern is estimated by the code pattern estimation section 7-6 based upon the result of this comparison; and bit strings are reconstructed by the bit string reconstruction section 7-7 based upon the result of this estimation, and are outputted as the decoded information 7-8.

Furthermore, as another apparatus structure of the decoding apparatus according to this embodiment, the decoding apparatus 7-2b shown in FIG. 7B is configured by providing an ideal reconstructed image calculation section 7-9, a reconstructed image calculation section 7-10, and an image comparison section 7-11 between the above-described ideal photographed image calculation section 7-4 and the code pattern estimation section 7-6.

In other words, in this case, the decoding apparatus 7-2b according to this embodiment is made up from the positional deviation amount detection section 7-3, the ideal photographed image calculation section 7-4, the ideal reconstructed image calculation section 7-9, the reconstructed image calculation section 7-10, the image compensation section 7-11, the code pattern estimation section 7-6, and the bit string reconstruction section 7-7.

The positional deviation amount detection section 7-3 detects the amount of positional deviation between the two-dimensional image which has been coded and the imaging device.

The ideal photographed image calculation section 7-4, as described previously, calculates ideal photographed images, based upon the amount of positional deviation which has been detected. Here, by the ideal photographed images, are meant photographed images of the code blocks for all the code patterns which are used by the code block conversion section 1-5 in the coding apparatus.

The ideal reconstructed image calculation section 7-9 calculates ideal reconstructed images of the two-dimensional image from the ideal photographed images which have been calculated by the ideal photographed image calculation section 7-4, based upon the amount of positional deviation which has been detected by the positional deviation amount detection section 7-3, and transfers them to the image comparison section 7-11.

The reconstructed image calculation section 7-10 calculates the reconstructed image of the two-dimensional image from the photographed image, based upon the amount of positional deviation which has been detected by the positional deviation amount detection section 7-3, and transfers it to the image comparison section 7-11.

The image comparison section 7-11 calculates a relative value (for example, similarity) between the ideal reconstructed images which have been calculated by the ideal reconstructed image calculation section 7-9, and the reconstructed image which has been calculated by the reconstructed image calculation section 7-10.

The code pattern estimation section 7-6 estimates the pattern of the code block, based upon the relative value which has been calculated by the image comparison section 7-11. For example, this code pattern estimation section 7-6 estimates that the pattern which has the highest similarity, as calculated by the image comparison section 7-5, is the pattern of the code block.

The bit string reconstruction section 7-7 decodes the information bits, based upon the result of pattern estimation, and outputs it.

The two procedures for the decoding methods of FIGS. 8A and 8B will now be explained.

First, the first method shown in FIG. 8A will be explained.

In the photographic state in which the two-dimensional image and the imaging device are in an appropriate positional relationship (the step 8-1), a two-dimensional image is photographed by the imaging device, and this is taken as the photographed image (in the step 8-2).

Next, the amount of positional deviation between the two-dimensional image and the imaging device is detected (in the step 8-3). That is, as described above, a predetermined pattern is recorded in advance within the two-dimensional image, and, when performing the decoding, the rough position of this pattern within the photographed image is detected, and the detailed position of the pattern is detected based upon the rough position which has been detected and a calculated center of gravity of the distribution of the similarity between an area within the photographed image and the pattern. Then, the positional deviation amount between the two-dimensional image and the imaging device is detected based upon the position of the pattern which is recorded in advance, and the detailed position of the pattern which has been detected during decoding.

Ideal photographed images are calculated for the respective code patterns, based upon the amount of positional deviation which has been detected, and all the code patterns which are the subjects of decoding (in the step 8-4).

The actual photographed image and the ideal photographed images are then compared together (in the step 8-5).

The code pattern for the ideal photographed image which is found to be the closest by this comparison is estimated to be the code pattern which is recorded (in the step 8-6).

Next, the second method shown in FIG. 8B will be explained.

In the same way as in the first method, a two-dimensional image is photographed, and this is taken as the photographed image (in the steps 8-7 and 8-8).

Next, by a method which is the same as in the step 8-3, the amount of positional deviation between the two-dimensional image and the imaging device is detected (in the step 8-9).

Next, the ideal photographed images for the respective code patterns are calculated based upon the amount of positional deviation between the two-dimensional image and the imaging device, and upon the code patterns which are the subjects of decoding (in the step 8-10).

Next, the ideal reconstructed images are calculated based upon this ideal photographed images and the amount of positional deviation (in the step 8-11).

Next, a reconstructed image of the two-dimensional image is calculated based upon the amount of positional deviation which has been detected and the photographed image, (in the step 8-12).

Then, the actual reconstructed image and the ideal reconstructed images are compared together (in the step 8-13).

The pattern which is found to be the closest by this comparison is estimated to be the code pattern (in the step 8-14).

Furthermore, the two-dimensional image which is photographed by the imaging device is normally one which is taken out from some kind of medium, or is written upon some kind of medium; and it sometimes happens that a distortion or the like upon the imaging device takes place as it is photographed. In this case, the second method is applied, in which the reconstructed image is calculated in consideration of positional deviation and distortion, and the code pattern is estimated.

It should be understood that the photographed image 7-1 is obtained via the steps 8-1, 8-7, 8-2, and 8-8, the positional deviation amount detection section 7-3 performs the steps 8-3 and 8-9, the ideal photographed image calculation section 7-4 performs the steps 8-4 and 8-10, the ideal reconstructed image calculation section 7-9 performs the step 8-11, the reconstructed image calculation section 7-10 performs the step 8-12, the image comparison sections 7-5 and 7-11 respectively perform the steps 8-5 and 8-13, and the code pattern estimation section 7-6 performs the steps 8-6 and 8-14. The bit string reconstruction section 7-7 reconstructs the bit string of the code pattern which has been estimated from the bit string which was associated with the code pattern during coding, and finally outputs it as the decoded information 7-8.

In the following, the first and second methods will be explained in concrete terms.

First, the first method will be explained.

Initially, the code blocks are defined as in FIGS. 9A through 9P. These code blocks are made up from code areas 9-1 and guide areas 9-2, and bright spots 9-3 are present within the code areas 9-1.

Here, there are sixteen code patterns in which the number of the bright spots within the code area is 0, 1, 2, 3, or 4. In practice, the information bits are allocated to these code patterns, and they are used during reconstruction of the bit strings by the bit string reconstruction section 7-7. Accordingly, in this case, 16 patterns, in other words 4 bits, can be represented with 3×3 pixels, i.e., 9 pixels.

Figure 10A:
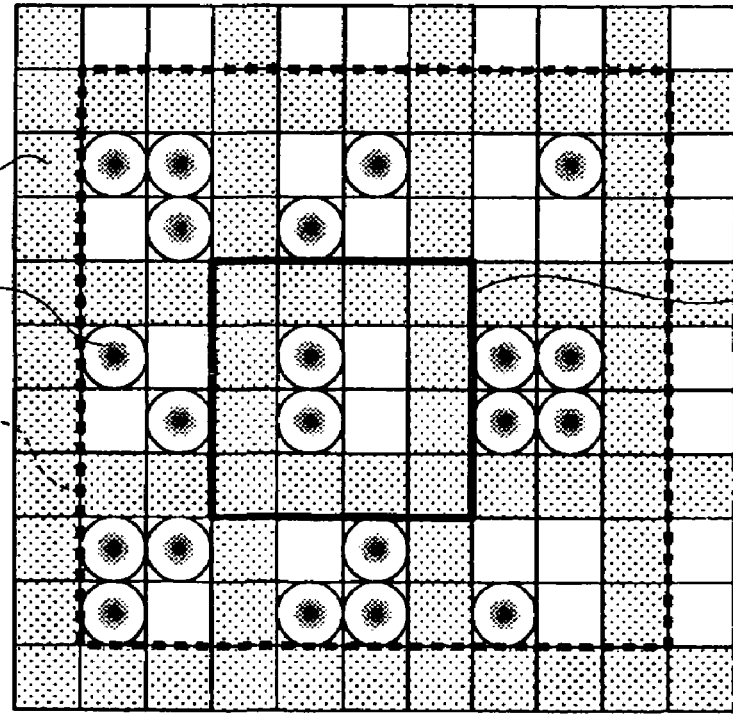
FIGS. 10A through 10C are figures for explanation of photography with an imaging device.
Figure 10B:
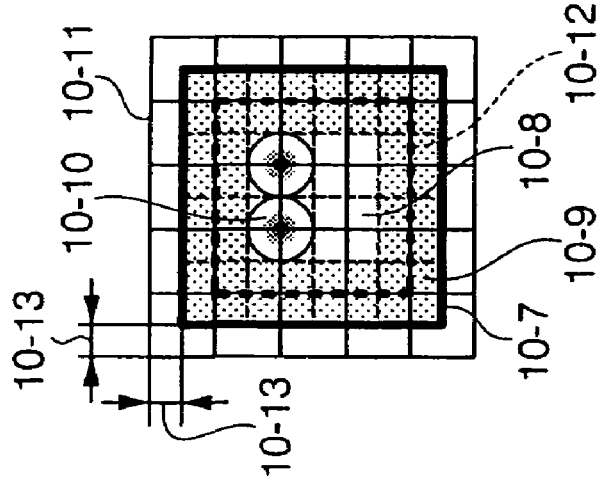
Figure 10C:
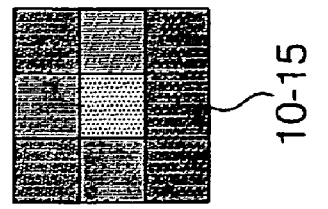

The photography by the imaging device is explained in FIGS. 10A through 10C. The recorded image 10-1 is made up from the 9 code blocks 10-2, and bright spots 10-3 are present in each of the code blocks. Furthermore, the area 10-4 which surrounds the code blocks represents the guide area.

At this time, photography by the imaging device of the area 10-5 in the central area is considered.

For example, FIG. 10B shows the photographic state 10-6 for the area 10-5. The area 10-7 corresponds to the area 10-5, 10-8 represents the code area of the code block, 10-9 represents the guide area which surrounds the code area, 10-10 represents the bright spot in the code area, and 10-11 represents the pixels of the imaging device; and the recorded image and the imaging device are arranged so as to be mutually deviated by the deviation 10-13.

In this case, 10-12 represents the area of pixels of the imaging device which includes the bright spot, and, since the guide area is present in the periphery of the code area, there is certainly no bright spot included in the area 10-12 except for the bright spots in its central area. Accordingly, it is possible to deal only with the area 10-12 during the processes after photography.

Here, it is supposed that the recorded image and the imaging device are mutually deviated by 0.5 pixel in both the horizontal direction and the vertical direction. In this case, the photographed image 10-14 represents the image which has been photographed in the photographic state 10-6. Here, the pixel values are shown by color, as with 10-15. In other words, the area where the bright spot is present is white, while the areas where it is not present are shown by black.

In other words, if the code block consists of m×n pixels, and the code area is (m−o)×(n−p) pixels (where m and n are natural numbers, and o and p are natural numbers which satisfy 0<o<m and 0<p<n), then the area 10-12 consists of (m−o+1)×(n−p+1) pixels. That is, the photographed image 10-14 is an image of (m−o+1)×(n−p+1) pixels. Here, when m=3, n=3, o=1, and p=1, the photographed image 10-14 is an image of 3×3 pixels.

Figure 11A:
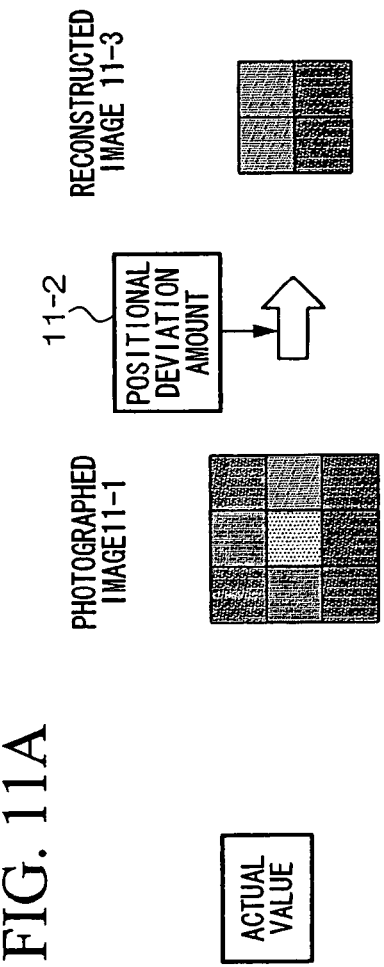
FIGS. 11A and 11B are figures for explanation of the flow of calculation for a reconstructed image.
Figure 11B:
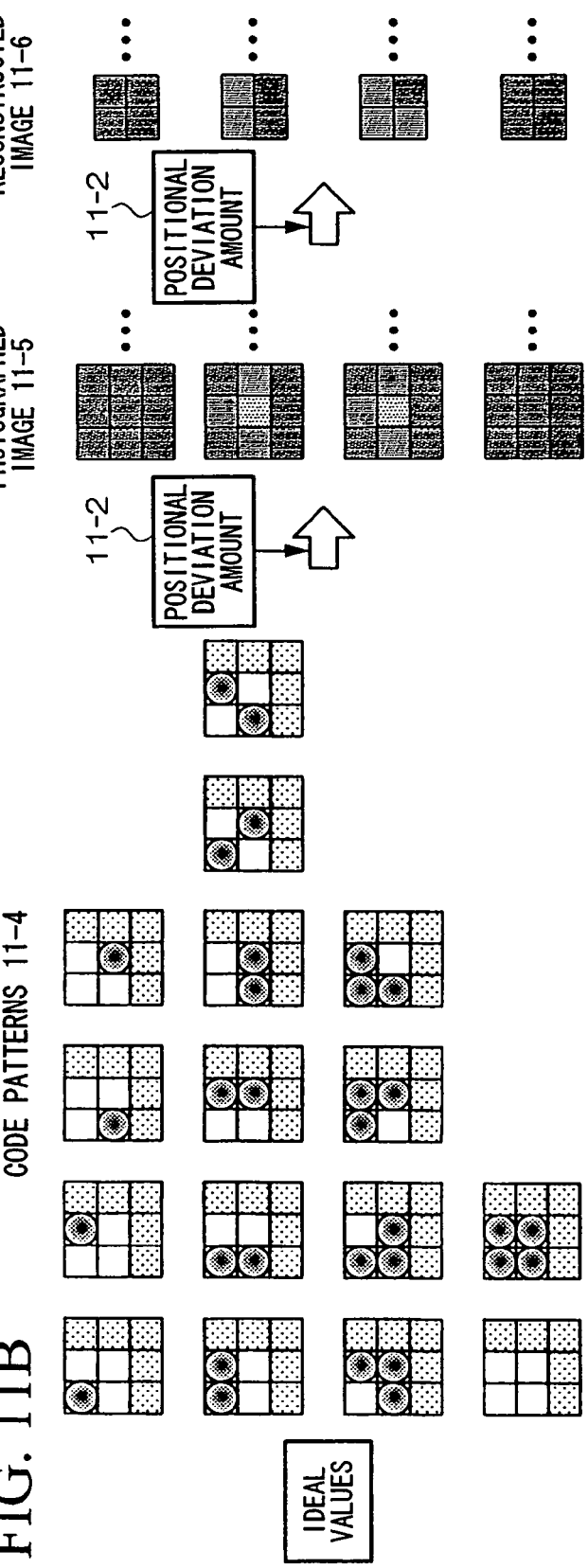

FIGS. 11A and 11B show the flow of calculation of ideal photographed images from the code patterns. Ideal photographed images 11-5 for the respective code patterns are calculated based upon all the code patterns 11-4 which are to be the subjects, and the amount of positional deviation 11-2. Then, the ideal photographed images 11-5 which have been calculated and the actual photographed image 11-1 are compared together, and the code pattern is thereby estimated. Specifically, for example, image matching is performed, similarity is calculated, and the comparison is performed with the result thereof.

Here, as has been explained in the above description, the actual photographed image 11-1 and the ideal photographed images 11-5 are generally images of (m−o+1)×(n−p+1) pixels, and, if m=3, n=3, o=1, and p=1, they are images of 3×3 pixels. Specifically, the ideal photographed images 11-5 are calculated by the following method.

Figure 12:
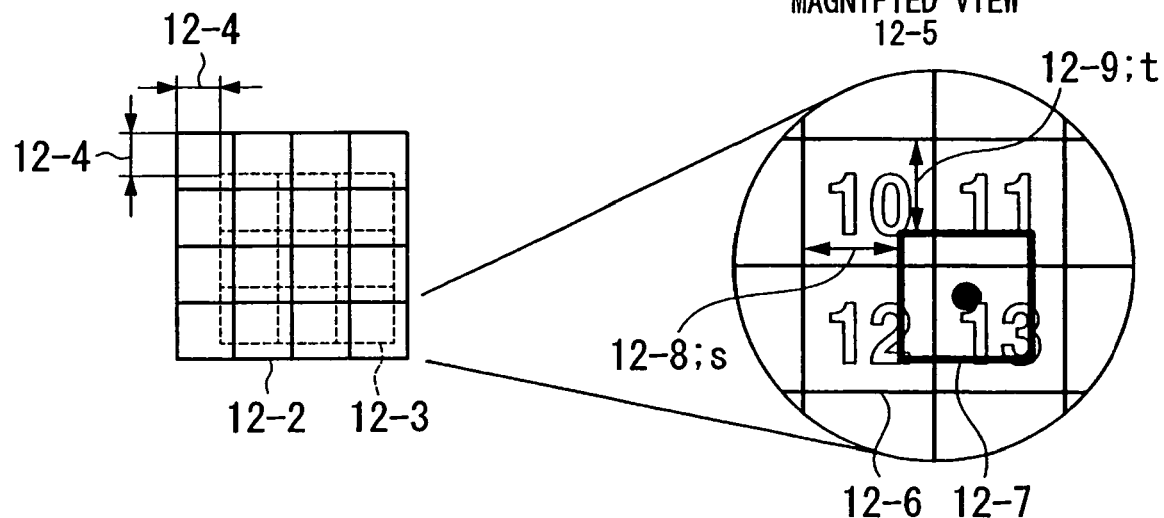
FIG. 12 is a figure for explanation of the calculation of an ideal photographed image.

In FIG. 12, the flow of the calculation of the ideal photographed images is explained.

It is possible to calculate the ideal photographed images from the amount of positional deviation between the recorded image and the imaging device, and the code patterns. 12-1 shows the positional relationship between the pixels of a code pattern and of an ideal photographed image. The code pattern 12-2 of 4×4 pixels which includes the guide areas of the neighboring code patterns, and the pixels 12-3 of the ideal photographed image of 3×3 pixels, are in a positional relationship which is deviated by the amount of positional deviation 12-4.

At this time, a magnified view of the vicinity of a part of the pixels is shown in FIG. 12-5.

12-6 represents the code pattern, and it is considered with the pixels numbered from 10 through 13. 12-7 represents a pixel of the ideal photographed image, and a pixel deviation of 12-8 in the horizontal direction and a pixel deviation 12-9 in the vertical direction are present.

At this time, the respective values with the amount of positional deviation normalized at the pixel size are taken as s and t, and the pixel values of each of the pixels 10 through 13 of the photographed image are respectively taken as v10, v11, v12, and v13. In this case, the pixel 12-7 is obtained by the following Equation (1):

$$(1-s)*(1-t)*v10 + s*(1-t)*v11 + (1-s)*t*v12 + s*t*v13 \quad (1)$$

Furthermore, the comparison of the ideal photographed images 11-5 and the actual photographed image 11-1 is performed, for example, by image matching, and calculation of similarity is performed.

Three methods will be explained for the method of calculation of the similarity. One of these is a method of calculating the similarity between the two images based upon the difference between them. If the pixel value for the pixel (x, y) of the actual photographed image 11-1 is taken as f(x, y), and the pixel value for the pixel (x, y) of the ideal photographed image 11-5 of the code pattern Pt is taken as $g_{Pt}(x, y)$, then the similarity can be calculated by Equation (2):

$$\sum_x \sum_y |f(x, y) - g_{Pt}(x, y)| \quad (2)$$

The code pattern Pt for which this value is minimum is taken as being the estimated pattern. In this case, it is effective to perform some type of normalization for the actual pixel values, or for the ideal pixel values, since unevenness in brightness or differences in brightness level may occur in the actual photographed image The second method is a method of calculating the similarity between the two images by normalization correlation. In the same way as with the method of calculating the similarity based upon the difference, if the pixel value for the pixel (x, y) of the actual photographed image 11-1 is taken as f(x, y), and the pixel value for the pixel (x, y) of the ideal photographed image 11-5 of the code pattern Pt is taken as $g_{Pt}(x, y)$, then the similarity can be calculated by Equation (3):

$$\frac{\sum_x \sum_y f(x, y) g_{Pt}(x, y)}{\sqrt{\sum_x \sum_y g_{Pt}^2(x, y)}} \quad (3)$$

The code pattern Pt for which this value is maximum is taken as being the estimated pattern. It should be noted that it is not possible to utilize Equation (3) if the denominator of Equation (3) becomes zero. In this case, the method using Equation (2) should be utilized.

The third method is a method of calculating the similarity between the two images by correlation after having performed normalization upon the average value and the standard deviation of the pixel values. As in the above-described two methods, if the pixel value for the pixel (x, y) of the actual photographed image 11-1 is taken as f(x, y), and the pixel value for the pixel (x, y) of the ideal photographed image 11-5 of the code pattern Pt is taken as $g_{Pt}(x, y)$, then the similarity can be calculated by Equation (4):

$$\sum_x \sum_y \left( \frac{f(x, y) - m_f}{\sigma_f} - \frac{g_{Pt}(x, y) - m_{g_{Pt}}}{\sigma_{g_{Pt}}} \right)^2 \quad (4)$$

Here, $m_f$ and $m_{g_{Pt}}$ respectively represent the average values of f(x, y) and $g_{Pt}(x, y)$, while $\sigma_f$ and $\sigma_{g_{Pt}}$ respectively represent the standard deviations of f(x, y) and $g_{Pt}(x, y)$. The code pattern Pt for which the value of this Equation (4) is the minimum is taken as the estimated pattern. It should be noted that it is not possible to utilize this equation if $\sigma_f$ or $\sigma_{g_{Pt}}$ becomes zero. In this case, the method which utilizes Equation (2) or the method which utilizes Equation (3) should be employed (however, only in the case that the denominator of Equation (3) does not become zero).

By utilizing Equation (4), it is possible to calculate the similarity to a higher accuracy, as compared to the cases of utilizing Equation (2) or Equation (3).

Here, in the three above-described methods of calculating the similarity, if the code block consists of 3×3 pixels, and the code area consists of 2×2 pixels, then the actual photographed image 11-1 and the ideal photographed images 11-5 are images of 3×3 pixels. Accordingly, the range of x and y for f(x, y) and $g_{Pt}(x, y)$ is the range of 3×3 pixels.

Generally, if a code block consists of m×n pixels, and the code area consists of (m−o)×(n−p) pixels (where m and n are natural numbers, and o and p are natural numbers which satisfy 0<o<m and 0<p<n), then the actual photographed image and the ideal photographed images are images of (m−o+1)×(n−p+1) pixels. Accordingly, the range of x and y for f(x, y) and $g_{Pt}(x, y)$ is the range of (m−o+1)×(n−p+1) pixels.

According to the above-described methods, even if the pitch or the position of the bright spots, or the size of the bright spots, or the brightness of the bright spots are different, it is possible to calculate their ideal behavior, so that the code pattern can be estimated.

Next, the second method will be explained.

As in the first method, initially, the code blocks are defined as in FIGS. 9A through 9P. These code blocks are made up from code areas 9-1 and guide areas 9-2, and bright spots 9-3 are present within the code areas 9-1.

Here, there are sixteen code patterns in which the number of the bright spots within the code area is 0, 1, 2, 3, or 4. In practice, the information bits are allocated to these code patterns, and they are used during reconstruction of the bit strings by the bit string reconstruction section 7-7. Accordingly, in this case, 16 patterns, in other words 4 bits, can be represented with 3×3 pixels, i.e., 9 pixels.

The photography by the imaging device is explained in FIGS. 10A through 10C. The recorded image 10-1 is made up from the 9 code blocks 10-2, and bright spots 10-3 are present in each of the code blocks. Furthermore, the area 10-4 which surrounds the code blocks represents the guide area.

At this time, photography by the imaging device of the area 10-5 in the central area is considered.

For example, 10-6 shows the photographic state for the area 10-5. The area 10-7 corresponds to the area 10-5, and 10-8 represents the code area of the code block, 10-9 represents the guide area which surrounds the code area, 10-10 represents the bright spot in the code area, and 10-11 represents the pixels of the imaging device; and the recorded image and the imaging device are arranged so as to be mutually deviated by the deviation 10-13.

In this case, 10-12 represents the area of pixels of the imaging device which includes the bright spot, and, since the guide area is present in the periphery of the code area, there is certainly no bright spot included in the area 10-12 except for the bright spots in its central area. Accordingly, it is possible to deal only with the area 10-12 during the processes after photography.

Here, it is supposed that the recorded image and the imaging device are mutually deviated by 0.5 pixel in both the horizontal direction and the vertical direction. In this case, the photographed image 10-14 represents the image which has been photographed in the photographic state 10-6. Here, the pixel values are shown by color, as with 10-15. In other words, the area where the bright spot is present is shown by white, while the area where the bright spot is not present is shown by black.

In other words, if the code block consists of m×n pixels, and the code area consists of (m−o)×(n−p) pixels (where m and n are natural numbers, and o and p are natural numbers which satisfy 0<o<m and 0<p<n), then the area 10-12 consists of (m−o+1)×(n−p+1) pixels. In other words, the photographed image 10-14 is an image of (m−o+1)×(n−p+1) pixels. Here, when m=3, n=3, o=1, and p=1, the photographed image 10-14 is an image of 3×3 pixels.

In FIGS. 11A and 11B, the flow of calculation of the reconstructed image is shown.

The reconstructed image of the actual photographed image can be calculated from the photographed image 11-1 and the amount of positional deviation 11-2 between the recorded image and the imaging device. The reconstructed image 11-3 is obtained as the result thereof. The details of the calculation of obtaining the reconstructed image 11-3 from the photographed image 11-1 and the amount of positional deviation 11-2 will be explained with reference to FIG. 13.

As for the reconstructed images of the ideal photographed images, ideal photographed images 11-5 for the respective code patterns are calculated based upon all the code patterns 11-4 which are to be the subjects and the amount of positional deviation 11-2, and the ideal reconstructed images 11-6 are obtained from these ideal photographed images 11-5 and the amount of positional deviation 11-2.

Here, as has been explained in the above description, the actual photographed image 11-1 and the ideal photographed images 11-5 are generally images of (m−o+1)×(n−p+1) pixels, and, if m=3, n=3, o=1, and p=1, then these photographed images are images of 3×3 pixels.

Furthermore, the actual reconstructed image 11-3 and the ideal reconstructed images 11-6 are images of (m−o)×(n−p) pixels in the same manner as the code area, and, if m=3, n=3, o=1, and p=1, these reconstructed images are images of 2×2 pixels.

Here, the details of the calculation to obtain the ideal photographed images may be performed by a method the same as in the case of the calculation of the ideal photographed images in the first method.

The method of obtaining the ideal photographed images will now be explained with reference to FIG. 12. The ideal photographed images can be calculated from the amount of positional deviation between the recorded image and the imaging device, and the code patterns. 12-1 shows the positional relationship between a code pattern and the pixels of an ideal photographed image. The code pattern 12-2 of 4×4 pixels including the guide area of the neighbouring code patterns, and the 3×3 pixels 12-3 of the ideal photographed image are in the positional relationship of being deviated by the amount of positional deviation 12-4.

A magnified view of the vicinity of a part of the pixels at this time is shown in FIG. 12-5.

12-6 represents the code pattern, and it is considered with the pixels numbered from 10 through 13. 12-7 represents a pixel of the ideal photographed image, and a pixel deviation of 12-8 in the horizontal direction and a pixel deviation of 12-9 in the vertical direction are present.

At this time, the respective values with the amount of positional deviation normalized at the pixel size are taken as s and t, and the pixel values of each of the pixels 10 through 13 of the photographed image are respectively taken as v10, v11, v12, and v13. At this time, the pixel 12-7 is obtained according to the previously described Equation (1).

Furthermore, the details of the calculation to obtain the ideal reconstructed images 11-6 from the ideal photographed images 11-5 and the amount of positional deviation 11-2 will be explained with reference to FIG. 13.

Figure 13:
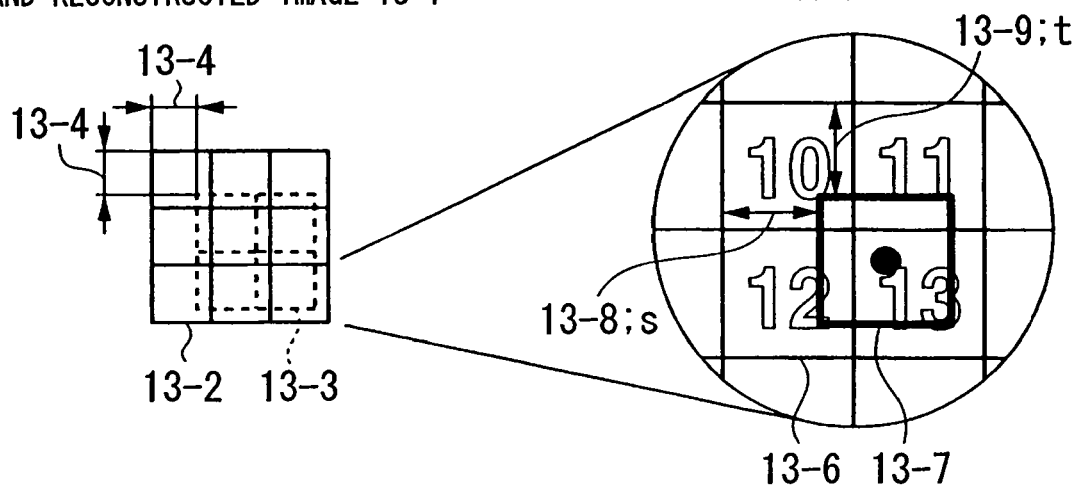
FIG. 13 is a figure for explanation of the calculation of a reconstructed image.

FIG. 13 explains the details of the above-described method of calculating the reconstructed image 11-3 and the ideal reconstructed images 11-6.

The reconstructed image 11-3 and the ideal reconstructed images 11-6 can be calculated from the amount of positional deviation 11-2, the photographed image 11-1, and the ideal photographed images 11-5.

13-1 represents the positional relationship between the pixels of the photographed image and of the reconstructed image. The photographed image 13-2 of 3×3 pixels and the 2×2 pixels 13-3 of the reconstructed image are in the positional relationship of being deviated by the amount of positional deviation 13-4.

In this case, 13-5 shows a magnified view of the vicinity of a part of the pixels.

13-6 represents the photographed image, and it is considered with the pixels numbered from 10 through 13. 13-7 represents a pixel of the reconstructed image; a pixel deviation of 13-8 in the horizontal direction, and a pixel deviation 13-9 in the vertical direction are present.

At this time, the values of the respective amounts of positional deviation, normalized by the pixel size, are taken as s and t, and the pixel values of each pixel 10 through 13 of the photographed image are taken respectively as v10, v11, v12, and v13. In this case, the pixel value of the pixel 13-7 is obtained by the above-described Equation (1).

It should be understood that, if distortion has occurred in the photographed image, it is possible to obtain the reconstructed image by taking account of this distortion in Equation (1).

Then, the actual reconstructed image 11-3 which has been thus calculated is compared with the ideal reconstructed images 11-6, and thereby the code pattern is estimated. Specifically, for example, image matching is performed, the similarity is calculated, and comparison is performed based upon the result. Here, three methods will be explained for the method of calculating the similarity. The first is a method of calculating the similarity between the two images based upon the difference. When the pixel value for the pixel (x, y) of the actual reconstructed image 11-3 is termed f(x, y), and the pixel value for the pixel (x, y) of the ideal reconstructed image 11-6 of the code pattern Pt is $g_{Pt}(x, y)$, then the similarity can be calculated by the Equation (2), described above.

The code pattern Pt for which this value is minimum is taken as being the estimated pattern. In this case, it is effective to perform some type of normalization upon the actual reconstructed image or upon the ideal reconstructed images, since it may happen that unevenness in brightness or differences in brightness level may occur in the actual photographed image.

The second is the method of calculating the similarity between the two images by normalization correlation. In the same way as in the case of calculating the similarity based upon the difference, if the pixel value for the pixel (x, y) of the actual reconstructed image 11-3 is taken as being f(x, y), and the pixel value for the pixel (x, y) of the ideal reconstructed image 11-6 of the code pattern Pt are taken as being $g_{Pt}(x, y)$, then the similarity can be calculated from the above-described Equation (3).

The code pattern Pt for which this value is maximum is taken as being the estimated pattern. It should be noted that it is not possible to utilize Equation (3) when the denominator of the Equation (3) becomes zero.

The third is the method of calculating the similarity between the two images by correlation after having performed normalization for the average value and the standard deviation of the pixel values. In the same way as with the two methods described above, if the pixel value for the pixel (x, y) of the actual reconstructed image 11-3 is taken as being f(x, y), and the pixel value for the pixel (x, y) of the ideal reconstructed image 11-6 of the code pattern Pt is taken as being $g_{Pt}(x, y)$, then the similarity can be calculated by the above-described Equation (4).

The code pattern Pt for which this value is minimum is taken as being the estimated pattern. It should be noted that it is not possible to take advantage of this method if $\sigma_f$ or $\sigma_{gPt}$ becomes zero. In this case, the method which employs the Equation (2) or the method which employs the Equation (3) should be taken advantage of (however, only in the case that the denominator of the Equation (3) does not become zero).

Here, in the above-described three methods of calculating the similarity, if the code block consists of 3×3 pixels and the code area consists of 2×2 pixels, then the actual reconstructed image 11-3 and the ideal reconstructed images 11-6 are images of 2×2 pixels. Accordingly, the range of x and of y for f(x, y) and $g_{Pt}(x, y)$ are the range of 2×2 pixels.

Generally, when the code block consists of m×n pixels and the code area consists of (m−o)×(n−p) pixels (where m and n are natural numbers, and o and p are natural numbers which satisfy 0<o<m and 0<p<n), the actual reconstructed image and the ideal reconstructed images are images of (m−o)×(n−p) pixels. Accordingly, the range of x and of y for f(x, y) and $g_{Pt}(x, y)$ are the range of (m−o)×(n−p) pixels.

According to the method described above, even if the pitch and the position of the bright spots, or the size of the bright spots, or the brightness of the bright spots or the like is different, it is possible to calculate their ideal behavior, and accordingly the code pattern can be estimated.

As has been explained above, according to the information coding apparatus and the information decoding apparatus of this embodiment, when optical information recording is performed, specific pixel values are disposed between mutually adjacent code blocks. Accordingly, the beneficial effects can be obtained that it is easy to separate the code blocks, and that it is possible to code information which is to be recorded in a two-dimensional manner at a higher information density.

Furthermore, according to the information coding apparatus and the information decoding apparatus of this embodiment, for the situation in which the minimum bright spot pitch of the coded image is less than or equal to 1 pixel, it is possible to estimate the code pattern which is recorded based upon the photographed image of the recorded image or its reconstructed image, and the ideal photographed images of the code patterns or their reconstructed images, so that it is possible to decode information which has been coded at a high density with good efficiency.

The above-described information coding apparatus and information decoding apparatus internally comprise computer systems.

In addition, the processes of the series of processes related to the above-described information coding process and information decoding process are stored in the form of programs upon a recording medium which can be read in by a computer, and the above-described processes are performed by these programs being read out by a computer and being executed.

In other words, the processing means and processing sections in the information coding apparatus and the information decoding apparatus are implemented by a central processing device (CPU) or the like reading out the above-described program in a main storage device such as a ROM or a RAM or the like, and executing the information processing and the calculation.

Here, by a recording medium which can be read in by a computer, is meant a magnetic disk, an opto-magnetic disk, a CD-ROM, a DVD-ROM, a semiconductor memory or the like. Furthermore, it would also be acceptable to distribute this computer program to a computer via a communication line, and for the computer which has received this distribution to execute the program.

It should be understood that the present invention is particularly effective in the case of application to a holographic memory or the like which makes a demand for a high density recording of information. However, the present invention is not to be considered as being limited thereto; it would be acceptable to apply it to general optical information recording and reproduction—for example, it might be applied to a two-dimensional bar code.

INDUSTRIAL APPLICABILITY

An information coding apparatus, an information decoding apparatus, and methods and programs for the same which are used for optical information recording and reproduction such as a hologram or the like are provided. According to the present invention, even if the code blocks are arranged upon the two-dimensional image in any manner, the code areas are not disposed adjacent to one another, so that it is possible to separate these code blocks reliably. Furthermore, according to the present invention, since the information bits which are disposed in the areas of other pixels are already known, it is possible to perform the decoding reliably by applying compensation corresponding to this. Yet further, according to the present invention, it is possible to design the coding with a high degree of freedom, according to the needs of the user or the characteristics of the recording medium or the like. Even further, according to the present invention, it is possible to estimate the code pattern which is recorded, so that it is possible to perform decoding of the information which has been coded at high density with good efficiency.

The invention claimed is:

1. An information coding apparatus comprising a code block conversion unit which codes information bits which are inputted as a block of a two-dimensional image made up from m (where m is a natural number)×n (where n is a natural number) pixels,
   wherein the code block conversion unit arranges pixels which represent the information bits in a code area, which is an area of (m−o)×(n−p) pixels within a code block of m×n pixels (where o and p are natural numbers which satisfy 0<o<m and 0<p<n); and arranges pixels which represent the information bits in a guide area, which is an area of the other pixels within the code block of m×n pixels.

2. An information coding apparatus comprising a code block conversion unit which codes information bits which are inputted as a block of a two-dimensional image made up from m (where m is a natural number)×n (where n is a natural number) pixels,
   wherein the code block conversion unit arranges pixels which represent the information bits in a code area, which is an area of (m−o)×(n−p) pixels within a code block of m×n pixels (where o and p are natural numbers which satisfy 0<o<m and 0<p<n); and arranges pixels which represent predetermined information bits in a guide area, which is an area of the other pixels within the code block of m×n pixels.

3. An information coding apparatus as described in claim 1 or claim 2, wherein the code block conversion unit determines the size and the position of a pixel which is arranged in the area of (m−o)×(n−p) pixels, based upon the size of the area of (m−o)×(n−p) pixels.

4. An information decoding apparatus comprising:
   a code pattern estimation unit which receives input of a photographed image which has been obtained by photographing a two-dimensional image which consists of an area of m×n pixels, in which a single code block comprises a code area in which (m−o)×(n−p) pixels which represent information bits (where m and n are natural numbers, and o and p are natural numbers which satisfy 0<o<m and 0<p<n) are arranged, and a guide area in which no pixels which represent the information bits are arranged, and which estimates a pattern of the code block based upon the result of relative comparison between the photographed image and images in an ideal state; and
   a bit string reconstruction unit which decodes the information bits of the photographed image which is inputted based upon the result of the estimation of the pattern.

5. An information decoding apparatus as described in claim 4, further comprising:
   a positional deviation amount detection unit which detects an amount of positional deviation between pixels of the two-dimensional image and pixels of the photographed image;
   an ideal photographed image calculation unit which calculates ideal photographed images of code blocks corresponding to code patterns based upon the amount of positional deviation which has been detected; and
   an image comparison unit which compares together the photographed image which is inputted and the ideal photographed images which have been calculated, and calculates relative values, and
   wherein the code pattern estimation unit estimates the pattern of the code block from the relative values which have been calculated.

6. An information decoding apparatus as described in claim 4, further comprising:
   a positional deviation amount detection unit which detects an amount of positional deviation between pixels of the two-dimensional image and pixels of a photographed image;
   an ideal photographed image calculation unit which calculates ideal photographed images of code blocks corresponding to code patterns based upon the amount of positional deviation which has been detected;
   an ideal reconstructed image calculation unit which calculates ideal reconstructed images of code blocks based upon the ideal photographed images which have been calculated, and the amount of positional deviation which has been detected;
   a reconstructed image calculation unit which calculates a reconstructed image of the two-dimensional image from the photographed image, based upon the amount of positional deviation which has been detected; and
   an image comparison unit which compares together the reconstructed image which has been calculated from the photographed image and the reconstructed images which have been calculated from the code blocks, and calculates relative values, and
   wherein the code pattern estimation unit estimates the pattern of the code block from the relative values which have been calculated.

7. An information coding method which codes information bits which are inputted as a block of a two-dimensional image made up from m (where m is a natural number)×n (where n is a natural number) pixels, the method comprising the steps of:
   arranging pixels which represent the information bits in a code area, which is an area of (m−o)×(n−p) pixels within a code block of m×n pixels (where o and p are natural numbers which satisfy 0<o<m and 0<p<n);
   arranging no pixels which represent the information bits in a guide area, which is an area of the other pixels within the code block of m×n pixels;
   dividing the inputted information bits into divided information bits based on the size of the code area; and
   coding the divided information bits into the code area.

8. An information coding method which codes information bits which are inputted as a block of a two-dimensional image made up from m (where m is a natural number)×n (where n is a natural number) pixels, the method comprising the steps of:
arranging pixels which represent the information bits in a code area, which is an area of (m−o )×(n−p) pixels within a code block of m×n pixels (where o and p are natural numbers which satisfy 0<o<m and 0<p<n);
arranging pixels which represent predetermined information bits in a guide area, which is an area of the other pixels within the code block of m×n pixels;
dividing the inputted information bits into divided information bits based on the size of the code area; and
coding the divided information bits into the code area.

9. An information coding method as described in claim 7 or claim 8, wherein the size and the position of a pixel which is arranged in the area of (m−o)×(n−p) pixels are determined based upon the size of the area of (m−o)×(n−p) pixels.

10. An information decoding method comprising the steps of:
receiving input of a photographed image which has been obtained by photographing a two-dimensional image which consists of an area of m×n pixels, in which a single code block comprises a code area in which (m−o )×(n−p) pixels which represent information bits (where m and n are natural numbers, and o and p are natural numbers which satisfy 0<o<m and 0<p<n) are arranged, and a guide area in which no pixels which represent the information bits are arranged;
estimating a pattern of the code block based upon the result of relative comparison between the photographed image and images in an ideal state; and
decoding the information bits of the photographed image which is inputted based upon the result of the estimation of the pattern.

11. An information decoding method as described in claim 10, further comprising the steps of:
detecting an amount of positional deviation between pixels of the two-dimensional image and pixels of the photographed image;
calculating ideal photographed images of code blocks corresponding to code patterns based upon the amount of positional deviation which has been detected;
comparing together the photographed image which is inputted and the ideal photographed images which have been calculated, and calculating relative values; and
estimating the pattern of the code block from the relative values which have been calculated.

12. An information decoding method as described in claim 10, further comprising the steps of:
detecting an amount of positional deviation between pixels of the two-dimensional image and pixels of the photographed image;
calculating ideal photographed images of code blocks corresponding to code patterns based upon the amount of positional deviation which has been detected;
calculating ideal reconstructed images of code blocks based upon the ideal photographed images which have been calculated, and the amount of positional deviation which has been detected;
calculating a reconstructed image of the two-dimensional image from the photographed image based upon the amount of positional deviation which has been detected;
comparing together the reconstructed image which has been calculated from the photographed image and the reconstructed images which have been calculated from the code blocks, and calculating relative values; and
estimating the pattern of the code block from the relative values which have been calculated.

13. An information coding program embodied as computer executable instructions on a computer readable medium which causes a computer to execute a coding process of coding information bits which are inputted as a block of a two-dimensional image made up from m (where m is a natural number)×n (where n is a natural number) pixels, the coding process comprising the steps of:
arranging pixels which represent the information bits in a code area, which is an area of (m−o)×(n−p) pixels within a code block of m×n pixels (where o and p are natural numbers which satisfy 0<o<m and 0<p<n);
arranging no pixels which represent the information bits in a guide area, which is an area of the other pixels within the code block of m×n pixels
dividing the inputted information bits into divided information bits based on the size of the code area; and
coding the divided information bits into the code area.

14. An information coding program embodied as computer executable instructions on a computer readable medium which causes a computer to execute a coding process of coding information bits which are inputted as a block of a two-dimensional image made up from m (where m is a natural number)×n (where n is a natural number) pixels, the coding process comprising the steps of:
arranging pixels which represent the information bits in a code area, which is an area of (m−o)×(n−p) pixels within a code block of m×n pixels (where o and p are natural numbers which satisfy 0<o<m and 0<p<n);
arranging pixels which represent predetermined information bits in a guide area, which is an area of the other pixels within the code block of m×n pixels
dividing the inputted information bits into divided information bits based on the size of the code area; and
coding the divided information bits into the code area.

15. An information coding program as described in claim 13 or claim 14, wherein, in the coding process, the size and the position of a pixel which is arranged in the area of (m−o)×(n−p) pixels are determined based upon the size of the area of (m−o)×(n−p) pixels.

16. An information decoding program embodied as computer executable instructions on a computer readable medium which causes a computer to execute;
a process of receiving input of a photographed image which has been obtained by photographing a two-dimensional image which consists of an area of m×n pixels, in which a single code block comprises a code area in which (m−o)×(n−p) pixels which represent information bits (where m and n are natural numbers, and o and p are natural numbers which satisfy 0<o<m and 0<p<n) are arranged, and a guide area in which no pixels which represent the information bits are arranged, and of estimating a pattern of the code block based upon the result of relative comparison between the photographed image and images in an ideal state; and
a process of decoding the information bits of the photographed image which is inputted based upon the result of the estimation of the pattern.

17. An information decoding program as described in claim 16, which further causes the computer to execute:
a process of detecting an amount of positional deviation between pixels of the two-dimensional image and pixels of the photographed image;
a process of calculating ideal photographed images of code blocks corresponding to code patterns based upon the amount of positional deviation which has been detected;

a process of comparing together the photographed image which is inputted and the ideal photographed images which have been calculated, and calculating relative values; and a process of estimating the pattern of the code block from the relative values which have been calculated.

18. An information decoding program as described in claim 16, which further causes the computer to execute:

a process of detecting an amount of positional deviation between pixels of the two-dimensional image and pixels of the photographed image;

a process of calculating ideal photographed images of code blocks corresponding to code patterns based upon the amount of positional deviation which has been detected;

a process of calculating ideal reconstructed images of code blocks based upon the ideal photographed images which have been calculated, and the amount of positional deviation which has been detected;

a process of calculating a reconstructed image of the two-dimensional image from the photographed image based upon the amount of positional deviation which has been detected;

a process of comparing together the reconstructed image which has been calculated from the photographed image and the reconstructed images which have been calculated from the code blocks, and calculating relative values; and a process of estimating the pattern of the code block from the relative values which have been calculated.

* * * * *